(12) United States Patent
Kloiber et al.

(10) Patent No.: US 11,704,479 B2
(45) Date of Patent: *Jul. 18, 2023

(54) METHODS AND SYSTEMS FOR CREATING, INTERACTING WITH, AND UTILIZING A SUPERACTIVE DOCUMENT

(71) Applicant: Open Text Corporation, Waterloo (CA)

(72) Inventors: Daniel J. Kloiber, Lexington, KY (US); Davis L. Marksbury, Lexington, KY (US); Christopher J. Heinz, Lexington, KY (US); Robert C. Guckenberger, Danville, KY (US); Ronald L. Heiney, Rowlett, TX (US); Kenneth E. Gibbs, Lexington, KY (US)

(73) Assignee: OPEN TEXT CORPORATION, Waterloo (CA)

(*) Notice: Subject to any disclaimer, the term of this patent is extended or adjusted under 35 U.S.C. 154(b) by 191 days.

This patent is subject to a terminal disclaimer.

(21) Appl. No.: 16/730,588

(22) Filed: Dec. 30, 2019

(65) Prior Publication Data

US 2020/0134256 A1 Apr. 30, 2020

Related U.S. Application Data

(63) Continuation of application No. 15/639,624, filed on Jun. 30, 2017, now Pat. No. 10,565,300, which is a continuation of application No. 12/870,497, filed on Aug. 27, 2010, now Pat. No. 9,727,543, which is a continuation of application No. 11/552,862, filed on Oct. 25, 2006, now Pat. No. 9,201,854.

(51) Int. Cl.
| | | |
|---|---|---|
| G06F 16/93 | (2019.01) | |
| G06F 16/958 | (2019.01) | |
| G06F 40/166 | (2020.01) | |
| G06F 40/103 | (2020.01) | |
| G06F 40/143 | (2020.01) | |

(52) U.S. Cl.
CPC ............ *G06F 40/143* (2020.01); *G06F 16/93* (2019.01); *G06F 16/958* (2019.01); *G06F 40/103* (2020.01); *G06F 40/166* (2020.01)

(58) Field of Classification Search
CPC .... G06F 40/143; G06F 40/103; G06F 40/166; G06F 16/958; G06F 16/93
See application file for complete search history.

(56) References Cited

U.S. PATENT DOCUMENTS

| | | |
|---|---|---|
| 4,905,146 A | 2/1990 | Barker |
| 5,583,983 A | 12/1996 | Schmitter |
| 5,634,019 A | 5/1997 | Koppolu |
| 5,634,064 A | 5/1997 | Warnock et al. |
| 5,644,776 A | 7/1997 | DeRose et al. |
| 5,664,208 A | 9/1997 | Pavely |

(Continued)

OTHER PUBLICATIONS

The Microsoft Office Open XML Format: Preview for Developers, Jun. 2005, retrieved from: http://www.microsoft.com/office/preview, pp. 1-22.

(Continued)

*Primary Examiner* — Thu V Huynh
(74) *Attorney, Agent, or Firm* — Sprinkle IP Law Group

(57) ABSTRACT

A method of processing an interactive document is enclosed.

24 Claims, 11 Drawing Sheets

(56) References Cited

U.S. PATENT DOCUMENTS

| | | | |
|---|---|---|---|
| 5,680,619 A | 10/1997 | Gudmundson | |
| 5,754,175 A | 5/1998 | Koppolu | |
| 5,903,905 A | 11/1999 | Andersen | |
| 6,073,118 A | 6/2000 | Gormish | |
| 6,237,099 B1 | 5/2001 | Kurokawa | |
| 6,662,340 B2 | 12/2003 | Rawat | |
| 6,681,371 B1 | 1/2004 | Devanbu | |
| 6,684,369 B1 | 1/2004 | Bernardo | |
| 6,748,425 B1 | 6/2004 | Duffy | |
| 6,778,989 B2 | 8/2004 | Bates et al. | |
| 6,832,351 B1 | 12/2004 | Batres | |
| 6,904,432 B2 | 6/2005 | Charlot | |
| 6,928,610 B2 | 8/2005 | Brintzenhofe et al. | |
| 6,938,051 B1 | 8/2005 | Burger et al. | |
| 6,944,669 B1 | 9/2005 | Saccocio | |
| 6,944,829 B2 | 9/2005 | Dando | |
| 6,948,115 B2 | 9/2005 | Aizikowitz et al. | |
| 6,954,220 B1 | 10/2005 | Bowman-Amuah | |
| 6,961,750 B1 | 11/2005 | Burd et al. | |
| 6,981,215 B1 | 12/2005 | Lindhorst et al. | |
| 6,990,480 B1 | 1/2006 | Burt | |
| 7,036,072 B1 | 4/2006 | Sulistio et al. | |
| 7,039,863 B1 | 5/2006 | Caro et al. | |
| 7,107,525 B2 | 9/2006 | Purvis | |
| 7,127,520 B2 | 10/2006 | Ladd et al. | |
| 7,237,193 B1 | 6/2007 | Zaky et al. | |
| 7,302,674 B1 | 11/2007 | Gladieux | |
| 7,325,188 B1* | 1/2008 | Covington | G06F 16/958 |
| | | | 715/251 |
| 7,430,711 B2 | 9/2008 | Rivers-Moore | |
| 7,437,310 B1 | 10/2008 | Dutta | |
| 7,548,957 B1 | 6/2009 | Wichmann | |
| 7,584,417 B2 | 9/2009 | Friend | |
| 7,664,751 B2 | 2/2010 | O'Sullivan | |
| 7,668,913 B1 | 2/2010 | Underwood | |
| 7,912,971 B1 | 3/2011 | Dunn | |
| 8,407,309 B1* | 3/2013 | Feldman | G06F 16/958 |
| | | | 709/219 |
| 9,201,854 B1 | 12/2015 | Kloiber et al. | |
| 9,727,543 B2 | 8/2017 | Kloiber et al. | |
| 9,792,270 B2 | 10/2017 | Kloiber et al. | |
| 10,565,300 B2 | 2/2020 | Kloiber | |
| 2002/0032732 A1 | 3/2002 | Shigehara | |
| 2002/0046109 A1 | 4/2002 | Leonard | |
| 2002/0055880 A1 | 5/2002 | Unold et al. | |
| 2002/0091770 A1 | 7/2002 | Takahura et al. | |
| 2002/0103663 A1 | 8/2002 | Bankier | |
| 2002/0111824 A1 | 8/2002 | Grainger | |
| 2002/0129056 A1 | 9/2002 | Contant | |
| 2002/0133468 A1 | 9/2002 | Mertens | |
| 2003/0028792 A1 | 2/2003 | Plow | |
| 2003/0101086 A1 | 5/2003 | San Miguel | |
| 2003/0149661 A1 | 8/2003 | Mitchell | |
| 2003/0167315 A1 | 9/2003 | Chowdhry | |
| 2003/0200213 A1 | 10/2003 | Charlot et al. | |
| 2004/0010598 A1* | 1/2004 | Bales | G06F 8/30 |
| | | | 709/228 |
| 2004/0019850 A1 | 1/2004 | Purvis et al. | |
| 2004/0049539 A1 | 3/2004 | Reynolds | |
| 2004/0049740 A1 | 3/2004 | Petersen | |
| 2004/0098451 A1* | 5/2004 | Mayo | H04L 67/568 |
| | | | 707/E17.109 |
| 2004/0133876 A1 | 7/2004 | Sproule | |
| 2004/0139401 A1 | 7/2004 | Unbedacht | |
| 2004/0199497 A1* | 10/2004 | Timmons | G06F 16/951 |
| | | | 707/E17.112 |
| 2004/0204998 A1 | 10/2004 | Shah | |
| 2004/0236660 A1 | 11/2004 | Thomas | |
| 2005/0015711 A1 | 1/2005 | Yamamoto | |
| 2005/0119910 A1* | 6/2005 | Schneider | G06F 16/972 |
| | | | 705/26.1 |
| 2005/0138540 A1 | 6/2005 | Baltus | |
| 2005/0216503 A1 | 9/2005 | Charlot et al. | |
| 2005/0216572 A1 | 9/2005 | Tso et al. | |
| 2006/0047847 A1 | 3/2006 | Saccocio | |
| 2006/0085500 A1* | 4/2006 | Allamaraju | G06F 16/958 |
| | | | 707/E17.116 |
| 2006/0168512 A1 | 7/2006 | Wilson | |
| 2006/0200751 A1 | 9/2006 | Underwood | |
| 2006/0225094 A1* | 10/2006 | Facemire | G06F 3/0486 |
| | | | 725/45 |
| 2006/0256357 A1 | 11/2006 | Hochwender | |
| 2006/0271834 A1* | 11/2006 | Wang | G06F 16/958 |
| | | | 715/236 |
| 2006/0282762 A1 | 12/2006 | Diamond | |
| 2006/0287966 A1 | 12/2006 | Srinivasaraghavan | |
| 2007/0016434 A1 | 1/2007 | Oppenheimer et al. | |
| 2007/0073701 A1* | 3/2007 | Miller | G06F 3/0486 |
| 2007/0100871 A1 | 5/2007 | Clemm | |
| 2007/0110231 A1 | 5/2007 | Bales | |
| 2007/0279816 A1 | 12/2007 | Chung | |
| 2008/0082573 A1 | 4/2008 | Fish | |
| 2008/0091663 A1 | 4/2008 | Inala | |
| 2009/0282006 A1 | 11/2009 | Misvaer | |
| 2010/0228568 A1 | 9/2010 | Altee et al. | |
| 2011/0131114 A1 | 6/2011 | Al-Mubarak et al. | |
| 2012/0210247 A1 | 8/2012 | Khouri | |
| 2013/0073738 A1 | 3/2013 | Reisman | |
| 2017/0300465 A1 | 10/2017 | Kloiber et al. | |

OTHER PUBLICATIONS

The Microsoft Office Open XML Formats: New Fite Formats for "Office 12", Jun. 2005, retrieved from: http://www.microsoft.com/office/preview, pp. 1-16.

Workplace Forms, Application Programmer Interface (API), 2005, IBM Corp., pp. 1-4.

Overview of IBM Workplace Forms, IBM Workplace Forms Version 2.6 Apr. 2006, pp. 1-17.

Adobe LiveCycle Policy Server Integration (2005), Adobe Systems, Inc., San Jose, CA, pp. 1-8.

Herman, Michael, "Microsoft SharePoint Products and Technologies: Technical Overview", Jun. 2003 (Updated Aug. 19, 2003), Parallel Corporation, retrieved from: http://www.microsoft.com/technet/prodtechnol/office/sharepoint/2003/plan/-spst23to.mspx, pp. 1-12.

The Drive for Intelligent Documents in Financial Services, Adobe Systems, Nov. 2004, Metagroup, Inc., Stamford, CT, retrieved from: http://www.metagroup.com, pp. 1-17.

Schadler, Ted, et al., Microsoft Introduces the Live Document, Oct. 22, 2002, pp. 1-3.

Mashberg, Tom, "Technology Review: Smart Pages Xerox Technology Protects Sensitive Digital Information", Sep. 7, 2006, retrieved from: http://www.technologyreview.com/printer.sub.--friendly.sub.--article.aspx-?id-17403, pp. 1-2.

Centralized PDF Conversion Featuring Adobe LiveCycle PDF Generator 7.0, Oct. 2005, 9 pgs.

Murphy, Barry, Adobe LiveCycle: An e-Forms Leader Combining Strong Forms Design With Ubiquitous Access, The Forrester Wave Vendor Summary Q2 2006, Jun. 16, 2006, Tech Choices, Forrester Research, Inc., Cambridge, MA, pp. 1-5.

Aspects of Document Security, 2005, IBM Corp, pp. 1-4.

Murphy, Barry, The Forrester Wave: e-Forms Software, Q2 2006, Tech Choices, pp. 1-14.

Murphy, Barry, FileNet P8 e-Forms: A Strong Performer in e-Forms With a Focus on BPM, The Forrester Wave Vendor Summary Q2 2006, Tech Choices, Jun. 16, 2006, pp. 1-5.

Murphy, Barry, IBM Workplace Forms: An e-Forms Leader Targeting Secure Forms, The Forrester Wave Vendor Summary Q2 2006, Tech Choices, Jun. 16, 2006, pp. 1-5.

Murphy, Barry, Microsoft InfoPath: A Strong Performer in e-Forms Leveraging MS Office, The Forrester Wave Vendor Summary Q2 2006, Tech Choices, Jun. 16, 2006, pp. 1-5.

Streamlining Document-Based Processes with Adobe LiveCycle Reader Extensions, Adobe Systems, Inc., San Jose, CA, Jun. 2006, pp. 1-10.

(56) References Cited

OTHER PUBLICATIONS

Cardiff, Intelligent Documents. Better BPM: A Guide to Accelerating Your Most Demanding Business Process, Cardiff, Vista, CA, Jul. 2006, pp. 1-12.
Mashberg, Tom, Technology Review: Smart Pages—Xerox Technology Protects Sensitive Digital Information, Sep. 7, 2006, pp. 1-2.
Software 602XML2 Announces 602XML2: "Intelligent, Electronic XML-Based Forms", retrieved from http://www.602xmlforms.com/press.sub.--release.html, Jul. 18, 2006, pp. 1-2 and printed on Jun. 21, 2007.
ActiveDocs: Smart documents start with ActiveDocs, Keylogix Ltd., retrieved from: www.activedocs.com, Feb. 2, 2006, pp. 1-4.
The Microsoft Office Open XML Format: Preview for Developers, Jun. 2005, retrieved from: http://www.microsoft.com/office/preview, 21 pgs.
Biggs, Maggie, Efficient e-forms, Federal Computer Week, Aug. 1, 2005, ProQuest Computing, vol. 19, Issue 25, 8 pgs.
Boyer, John M., Xforms & Cause-and-Effect Programming, Dr. Dobb's Journal, Apr. 2005, ProQuest Computing, 5 pgs.
Office Action for U.S. Appl. No. 11/552,862, dated Sep. 17, 2009, 23 pgs.
Office Action for U.S. Appl. No. 11/552,862, dated Mar. 31, 2010, 26 pgs.
Office Action for U.S. Appl. No. 12/870,497, dated Jun. 21, 2012, 15 pgs.
Office Action for U.S. Appl. No. 12/882,757, dated Oct. 3, 2012, 21 pgs.
Office Action for U.S. Appl. No. 12/870,497, dated Jan. 4, 2013, 15 pgs.
Office Action for U.S. Appl. No. 12/882,757, dated Feb. 27, 2013, 17 pgs.
Office Action for U.S. Appl. No. 12/882,757, dated Aug. 30, 2013, 20 pgs.
Office Action for U.S. Appl. No. 12/870,497, dated Dec. 19, 2013, 19 pgs.
Office Action for U.S. Appl. No. 12/882,757, dated Mar. 28, 2014, 23 pgs.
Office Action for U.S. Appl. No. 12/870,497, dated Jul. 2, 2014, 23 pgs.
Office Action for U.S. Appl. No. 15/639,624 dated Nov. 30, 2017, 24 pgs.
Office Action for U.S. Appl. No. 15/639,624 dated May 31, 2018, 23 pgs.
Office Action for U.S. Appl. No. 15/639,624 dated Nov. 13, 2018, 12 pgs.
Office Action for U.S. Appl. No. 15/639,624 dated May 24, 2019, 16 pgs.
Notice of Allowance for U.S. Appl. No. 15/639,624 dated Oct. 2, 2019, 5 pgs.

* cited by examiner

SUPERACTIVE DOCUMENT ENVIRONMENT

LOGICAL FILE FORMAT

PYHSICAL FILE FORMAT

INTERACTIVE EDIT PROCESS FLOW

METHODS AND SYSTEMS FOR CREATING, INTERACTING WITH, AND UTILIZING A SUPERACTIVE DOCUMENT

CROSS-REFERENCE TO RELATED APPLICATIONS

This application is a continuation of, and claims a benefit of priority under 35 U.S.C. 120 of the filing date of U.S. patent application Ser. No. 15/639,624 filed Jun. 30, 2017, entitled "Methods and Systems for Creating, Interacting With, and Utilizing a Superactive Document", issued as U.S. Pat. No. 10,565,300, which is a continuation of, and claims a benefit of priority under 35 U.S.C. 120 of the filing date of U.S. patent application Ser. No. 12/870,497 filed Aug. 27, 2010, entitled "Methods and Systems for Creating, Interacting With, and Utilizing a Superactive Document", issued as U.S. Pat. No. 9,727,543, which is a continuation of, and claims a benefit of priority under 35 U.S.C. 120 of the filing date of U.S. patent application Ser. No. 11/552,862 filed Oct. 25, 2006, entitled "Methods and Systems for Creating, Interacting With, and Utilizing a Superactive Document", issued as U.S. Pat. No. 9,201,854, all of which are incorporated herein by reference.

TECHNICAL FIELD

The present invention relates generally to electronic documents and systems and methods therefor, and more particularly relates to methods and systems for creating, providing mechanisms for user interaction with, and utilizing a superactive document, including the providing of print and electronic versions of such superactive documents, and providing for processing of such superactive documents by computer-implemented processes of an enterprise.

BACKGROUND

Enterprises use documents to communicate with internal and external customers as well as to regulate and control process flows. Within a process, documents are used to improve the efficiency and effectiveness of the process while providing a primary interface within the process. Dialogue, a software product from Exstream Software, continues to prove it can effectively and dramatically lower cost in the production process of high value documents. Further, Dialogue enables the document itself to be highly personalized and customized to a specific process or to a specific end customer.

As a customer, employee or agent of the enterprise, users interact with numerous documents through the course of business. For example, customer service representatives (CSRs) interact with correspondence systems to create customized letters, insurance agents customize group policies, employees fill out forms for HR processes, and sales people create tailored proposals. These document systems share common requirements. All of these systems attempt to provide some level of control to ensure the document is completed accurately. Inaccurate documents at a minimum have a high cost to the enterprise and can result in severe consequences if sent externally to a customer. Consider a scenario where a proposal with inaccurate pricing was sent to a prospect. In one case, the cost will be too high and potentially risk the customer acquisition. In another, goods and services may be 'given away'.

Either case has significant impact to the bottom line.

In addition to providing control, interactive document systems are required to provide a flexible user environment. End users need the ability to enter information and data freely, where appropriate. Familiar editing environments allow adoption of systems within the enterprise to occur rapidly. Rapid adoption drives cost down when alternative systems are eliminated and propels the business in the right direction with improved user productivity.

Today's enterprise systems that have been implemented to support the control and flexibility requirements for interactive documents span a range of functionality from highly structured electronic forms possibly created in Adobe PDF to unstructured free form documents which might be created within Microsoft Word.

Systems that require very specific data collection have been built upon electronic form solutions. While control can be provided in e-form based solutions, the user is typically not provided a very flexible or personalized interaction. Consider that fields are usually not pre-filled causing redundant, unnecessary human interaction. Also, each customer or employee receives the same form, even if portions are irrelevant to them based on their situation.

In addition to failing to meet user flexibility requirements, the integration of desktop forms solutions into the enterprise's systems and production processes requires manual processing or very complex process steps wired together to provide a level of automation. In reality, the purpose of the form is typically to facilitate some larger process. Consider the following examples from both the enterprise and customer perspectives.

John Smith decides to open an account at his current financial institution for his son Tommy. John fills out a blank form. As he completes the form he initially becomes confused about the applicability of required information but eventually completes the form and submits it. Several days later Tommy receives a packet of disclosure statements and welcome letter in the mail.

After they received the account open form and deposit for Tommy's account, the financial institution extracted the data from the form, validated it, entered it into various systems, manually determined what needed to be sent to Tommy, picked and packed the material (including the welcome letter), printed it and mailed it.

Or, an employee experience . . . .

Sally Jones, who is single, needs to go through the benefits open enrollment process with her company to select options for next year. She fills out a blank form indicating what coverage she'd like to have changed from the current year. The problem is that she doesn't recall her current coverage and needs to cross reference other information forwarded from HR. With that information in hand, she completes the form, skipping the portions related to family benefits.

The employer must process all employee forms within a relatively short timeframe. The data entered needs to be extracted and re-keyed into a consolidated document for submission and processing by the provider. A copy of all completed forms is retained to ensure any discrepancy in the future can be resolved. Confirmation of the employee's benefits is not sent back because the employee was expected to retain their own copy.

Both examples illustrate the requirement for control to ensure appropriate selections and complete information is provided. Without structure and control provided by the form the downstream processes cannot be driven. The customer experience is clearly shown to be unsatisfactory however. Coincidentally, there are different classes of interactive applications that have put more value on providing user editing flexibility at the cost of less control. Correspondence, sales proposal, contract, and group policy systems currently provide a flexible document editing experience through the incorporation of MS Word or some other desktop editor. These systems attempt to address the control requirements through the use of MS Word macros or some other customization, but fall short in providing a scalable solution that ensures that enterprise requirements are fully satisfied. Consequently, a need exists for a superactive document, utilizable in a computer-implemented processes such as user interaction, printing, storage, communication with other entities, and submission to enterprise processes such as document creation, forms utilization, order fulfillment, customer service handling, accounting, marketing, personnel management, and a myriad of other enterprise- and organization-specific tasks and activities.

For these and other reasons, a need exists for the present invention.

SUMMARY

In response to these and other shortcomings of the prior art, the present invention provides systems and methods for creating, providing mechanisms for user interaction with, and utilizing a superactive document, including the providing of print and electronic versions of such superactive documents, and providing for processing of such superactive documents by computer-implemented processes of an enterprise.

According to one exemplary embodiment and aspect, the present invention provides for a superactive document, comprising: a container for encapsulating operative components in a predetermined electronic file format, the container including a compressed (zip) portion for storing predetermined portions of selected operative components; the operative components comprising: one or more content components for representing document contents including text, graphics, controls, sounds; an interaction orchestration component operative to display a user document interaction interface when the superactive document is processed by a compatible computer program; a control component for controlling user access to predetermined content components and utilization of predetermined interaction orchestration component subcomponents as a function of user characteristics including identity, title, role; instance data comprising predetermined information obtained during one or more of the following: interaction between a user and operations of an interaction orchestration component; data retrieval from an enterprise database controlled by an interaction orchestration component; data retrieved from an external database as a function of a predetermined data retrieval component; and data retrieved from an asynchronous information source.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
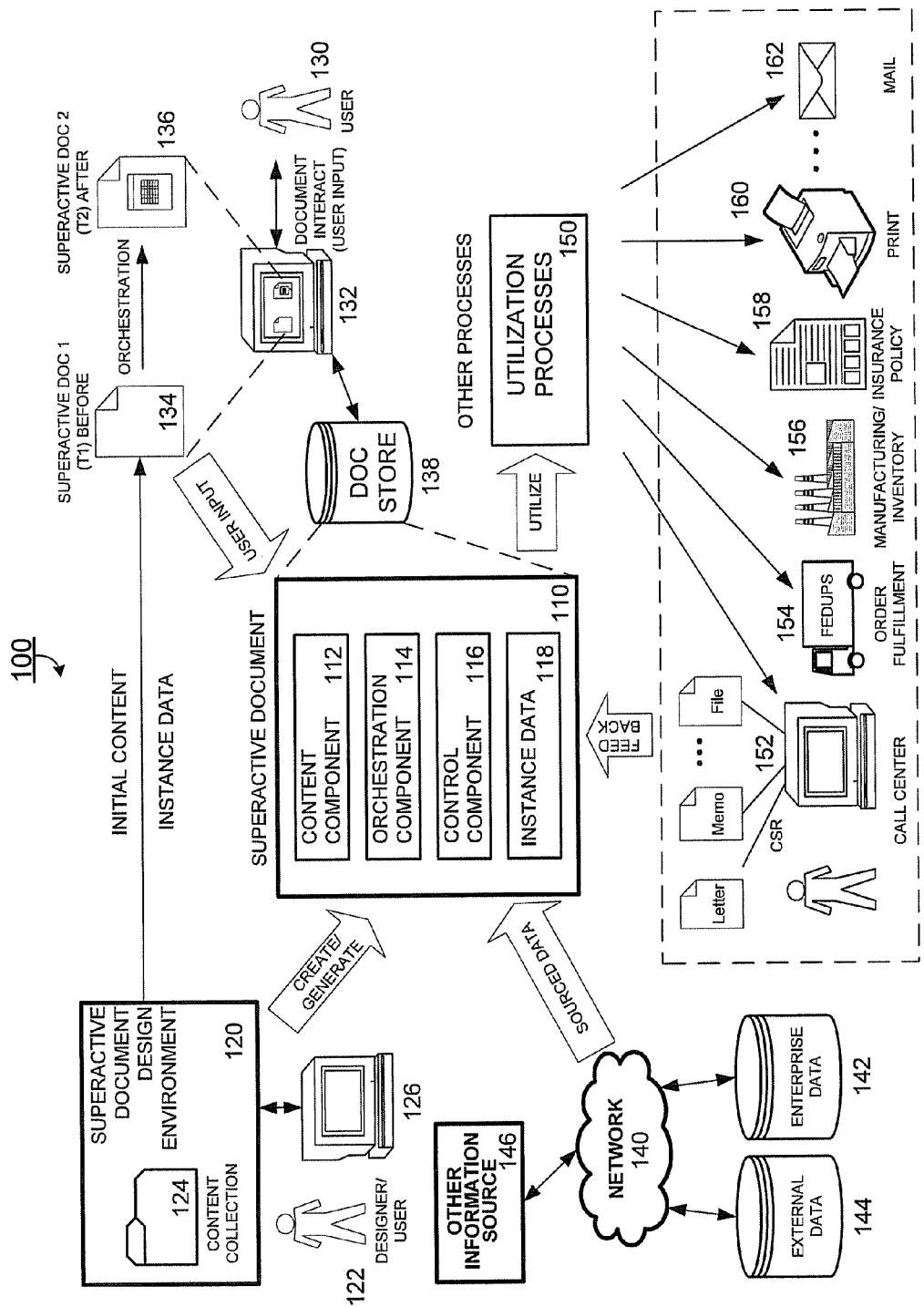
FIG. 1 is an overview of an exemplary superactive document processing system according to aspects of the present invention.

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Reference is now made in detail to the description of the embodiments as illustrated in the drawings. The invention may, however, be embodied in many different forms and should not be construed as limited to the embodiments set forth herein; rather, these embodiments are intended to convey the scope of the invention to those skilled in the art. Furthermore, all "examples" given herein are intended to be non-limiting.

The present invention provides systems and methods for creating, providing mechanisms for user interaction with, and utilizing a superactive document, including the providing of print and electronic versions of such superactive documents, and providing for processing of such superactive documents by computer-implemented processes of an enterprise.

Prior to a detailed description of the invention(s), the following definitions are provided as an aid to understanding the subject matter and terminology of aspects of the present invention(s), are exemplary, and not necessarily limiting of the invention(s), which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. A capitalized term within the glossary usually indicates that the capitalized term has a separate definition within the glossary. However, the capitalization or lack thereof within the remainder of this document is not intended to be necessarily limiting unless the context clearly indicates that such limitation is intended.

Access rights: the ability of a user or group of user to access a system, a portion of a system, or individual files within the system. Computer systems control the ability of the users affected to view or make changes to the contents of the system. Based on access rights certain parts of a document may be hidden or non-editable.

Application: a computer program that operates on a computer system, e.g. including, but not limited to, a computer program operated on an enterprise computing system, or a user's computer or workstation. Further examples of applications include programs that perform a search in a database, receive and store information in a temporary memory, display selected information on a display screen, etc., and virtually any other type of program.

Content collection: a collection of data and objects for use in designing a superactive document.

Content component: manages the relationship between the various portions of a superactive document.

Container: a logical file format for organizing and managing the content, control, orchestration, and instance data components of a superactive document.

Control component: component for managing user access to the superactive document. Users may be limited via rules, edit content and areas, edit and selection controls, and resource restrictions.

Create/generate: the process of producing a superactive document from initial content and instance data.

Document specific data: data that is unique to a particular superactive document.

Designer/user: A person that creates and/or generates a superactive document, by selection from predetermined superactive document components, perhaps using a predetermined document type template. A designer/user is typically personnel of an enterprise empowered to create a superactive document for use by other personnel of the enterprise and/or other persons associated with the enterprise. See User.

Enterprise: an organization or business entity that utilizes the present invention or aspects thereof. An Enterprise can be a business, a government agency, a person, or virtually any other organization that generates and/or utilizes documents reflective of its business activity.

Enterprise data: data related to the enterprise.

Entity: something that has a separate and distinct existence or conceptual reality outside the present invention. One example is an enterprise entity, which runs application(s) on its associated computer systems for generating, storing, communicating, and utilizing superactive documents in the activities of the enterprise.

External data: data that is not necessarily related to the enterprise or to the user.

File format: A format or arrangement for encoding information in a digital file that can be stored in, utilized in, or communicated between, computer systems. Each different type of file has a different file format. The file format specifies first a type of the file (e.g. whether the file is a binary file or ASCII file or XML file), and second, how the information is organized in the file into various components and how those components are identified and may be utilized.

Initial content: the initial information provided to the superactive document from the superactive document design environment.

Instance data component: manages the data that is unique to a particular superactive document.

I/O: input/output.

LAN: local-area network, a collection of computers that are connected for electronic communications, typically located geographically close together (that is, in the same building).

Network: a connection for communicating between computers or computer systems. A network usually involves at least two devices capable of being networked together with at least one device usually being a computer. The devices can be geographically close together (LAN) or geographically diverse (Internet).

Orchestration component: orchestrates the editing process and manages the creation and editing of the superactive document.

Protocol: A set of formal rules describing how to transmit data, especially across a network. Low level protocols define the electrical and physical standards to be observed, bit- and byte-ordering and the transmission and error detection and correction of the bit stream. High level protocols deal with the data formatting, including the syntax of messages, the terminal to computer dialogue, character sets, sequencing of messages etc.

Sourced data: data that is pulled into the superactive document, such as external data or enterprise data.

Superactive document: An electronic document comprising a container that includes one or more content components, an interaction orchestration component, a control component, and instance data.

Superactive document design environment: an interface through which superactive documents are created/generated.

User: A person that uses a superactive document, and views, edits and/or otherwise utilizes the contents and other aspects thereof. See Designer/user.

User identifier (user ID): a code used to identify a user to a computer system, or another component that requires information identifying a user for some purpose in connection with the invention.

UI: User Interface. Typically means a software application with which a User interacts for purposes of entering information, obtaining information, or causing functions of an associated system to execute.

User input: content data or information that a user adds to a superactive document.

Utilization processes: a function that is carried out as a result of the superactive document. Example utilization processes would be filling out or generating an insurance policy, fulfilling an order, placing an order, or creating a letter or memo as a result of customer service interactions.

WANs: wide-area networks, a collection of computers that are connected for electronic communications, typically where the computers are further apart than a LAN and are connected by telephone lines, fiber optic cables, satellite transmission, or radio waves.

WLAN: wireless local area network, e.g. a technology that is used to connect devices, including mobile devices, laptops, desktop computers, entertainment equipment, etc. through a wireless radio signal. Examples include the known WiFi and WMAX data communication standards.

Turning attention to the drawings, FIG. 1 is an overview of an exemplary superactive document processing system 100. The system 100 illustrates an embodiment of a document-centric process represented by a design phase, an implementation phase, data sourcing and utilization of a superactive document 110. A superactive document 110 may be created, interacted with by users 130, and utilized for processes such as order fulfillment 154, filling out or creating an insurance policy 158, and call center support 152, among others. Print and electronic versions of such superactive documents 110 may be provided in addition to processing of the superactive documents 110 by computer-implemented processes of the enterprise. The superactive document 110 (as highlighted at center of FIG. 1) is provided as a container with operative components in a predetermined electronic file format. A superactive document 110, might also be referred to as a superactive document container or superactive container, and contains operative components in an electronic file format. A superactive document 110 could include for example, but is not limited to, a compressed or zipped portion for storing predetermined portions of selected components. Thus, the file format, the file structure and the underlying infrastructure of a superactive document 110 are represented by the content component, the orchestration component, the control component and instance data, as shown in FIG. 1.

Superactive documents 110 are flexible-form, though not totally free-form, and are not bound by a pre-defined template. The superactive document 110 provides a controlled editing experience together with editing guidance and wizards necessary for enterprise-level interactive document applications, and allows the superactive document 110 to morph and change based on user interaction. While the superactive document 110 is portable and self-contained, it is also a paradigm of documents and pages, accepting input and data of varying types such as forms, text, presentation and PDF, for example.

The superactive document 110 changes and adjusts as information is inserted by the user 130. Paragraphs of text, forms, or charts may appear or disappear as user input causes the purpose of the superactive document 110 to change. Further, data that is entered by the user 130 during the interaction can also be sent back to the database to be available for future interactions with a customer, for example.

A superactive document 110 is created or generated via a designer in a superactive document design environment 120, as illustrated in FIG. 1. A content collection of data and objects may be used by the designer in the creation of a superactive document 110. Initial content is included in the superactive document 110 prior to user interaction or orchestration. Superactive document design allows for editable and viewable text, optional and selectable paragraphs, values for variables or text areas, text and paragraph rules processed dynamically based on user input, charts to be built dynamically, resource rights, and user rights, among others.

While a superactive document 110 may be created from the superactive document design environment 120, personalized documents may also be created via a production engine. The production engine allows for creation of a personalized version of the superactive document 110 based on available customer data.

The superactive document 110 is created or generated via a designer/user 122 in a superactive document design environment 120, as illustrated in the upper left quadrant of FIG. 1. The superactive document design environment 120 may operate as an application in a Windows operating system environment on a personal computer 126 or as a plug-in within a web browser environment, for example. The designer/user 122 creates a superactive document 110, the design facilitating how the superactive document 110 may be utilized throughout the utilization processes 150, thus determining how the superactive document 110 may be used in an interactive way by end-users. For example, the designer/user 122 may set the formats of the superactive document 110, may define how the content is made available or utilized in the superactive document 110, may define how authentication works, and may define how approvals are handled, among others. These and other design considerations are necessary to drive the document through the remainder of the superactive document process 100.

The design phase, as used in the superactive document design environment 120, is not merely an edit phase, but is more an application type development environment where the document that is designed becomes the application that is utilized. The design includes setting a framework of how objects and portions of the superactive document 110 are presented as well as the rules governing that presentation, thus setting the overall appearance of the superactive document 110 from the end-user's view. The design also includes defining which content will be utilized, by defining the data sources available and the rules governing their selection, as well as the access and authentication regarding user ability to change certain content elements and access to any or all available data sources.

The design of the superactive document 110 and how it is manifested to an end-user, together with different possibilities regarding end-user interaction throughout the superactive document 110 is completed in the superactive document design environment 120. Any changes to the superactive document 110 regarding content or structure occur within the limits defined by the design phase.

Once the superactive document 110 has been designed allowing for data in the format in which it will be interacted with, allowing for user interaction within the defined limits of interaction based on authentication and/or prioritization, the superactive document 110 is generated. Generation occurs after the design, and the generated superactive document 110 is then in a file format structure that will be used throughout any remaining processes. The superactive document 110 can be thought of as a data format with a structure. The logical file format structure (see FIG. 7) and the physical file format structure (see FIG. 8) will be covered in more detail below.

As the superactive document 110 is utilized, by an end-user for example, the content may expand, or even contract in some cases. The superactive document 110 is designed with and for a content collection 124, i.e., different content sources. There may be pages, multiple documents, customer interaction, customer data and even objects involved as part of the superactive document 110. The objects could be text, paragraphs or imaging, for example. The superactive document generation process renders the various content together into final form. The superactive document 110 is designed with the content in mind, but the data itself is actually merged together during the generation process that follows the design phase to create the superactive document 110.

The initial content and initial instance data is present and finished once a data stream in the superactive format is generated. Initial instance data is part of the superactive document design process and initial content data is generated as part of the superactive document generation process. Both are present in the initial version of the superactive document 110 within the instance data 118 component and the content component 112. This initial data can be highly personalized or may not be personalized at all. The basic initial version of a superactive document 110 may be a single controlled edit area that may be manipulated and extended during a superactive edit experience.

After superactive document 110 creation, a user 130 will interact with and change the superactive document 110, as shown in the upper right quadrant of FIG. 1. Editing is available as a web plug-in or as a thick client, and has an intuitive look, interactive controls and built-in validation. Beyond normal editing however, data entry forms provide for field controls, validation and calculation, drop down lists, and check boxes or radio buttons. Further, content editing provides dynamic page flow, dynamic content include/exclude and embedded rules. Also, the superactive document 110 is user aware and provides for show, hide or view only, dependent upon the user, editing rights, history and local system look-ups.

Once the data stream has been created, the focus shifts to what can be accomplished utilizing the superactive document 110. The ability to modify the data set allows for multiple possibilities. Superactive document 110 capabilities go well beyond the ability to change a name or an address. The user has the capability to fundamentally change the entire construct and format of the document after design and rendering. An original superactive doc 1 T(1) 134 prior to orchestration, proceeds from the design and original generation content phase as the first version of the superactive document 110 format. A user 130 may then interact with and make changes to the superactive document 110. For example, a user 130 could change imagery, change text, or input free-flowing text if they are allowed. A user 130 may perform all activities that are governed in the original superactive document design process. As an example, one type of user 130 may be able to add a text block capable of free-formatted text. Another type of user 130 may only be allowed to change a text block through a series of drop-down menus with additional content. These boundaries are set via the superactive document design process.

User input and interaction with the superactive document 110 is dictated by the controlling requirements created in the superactive document design process. One user 130 may be allowed to perform free-format, free-flow and free-edit to text in the superactive document 110. Another user's 130 authentication may only allow drop-down changes and that user 130 may only be able to select paragraphs from a list for inclusion in the superactive document 110. Still other users 130 may be allowed to insert images into the superactive document 110. Some users 130 will be allowed to make deletions of objects or text, while others may be more limited.

Another capability includes changing the imaging of the superactive document 110, for example, changing the entire format of the document in an interactive way. Certain changes will result in the format of the superactive document 110 changing according to what is allowed by the superactive document 110 design and how that change is manifested to the end-user. However, it should be noted that the user is not necessarily allowed to arbitrarily change the superactive document 110 in whatever way they may desire. The environment is still controlled according to the superactive document 110 design and changes are only allowed within the original context built into the superactive document 110. While the superactive document 110 is not just a form, it also is not just a free-form unstructured word processor type document.

As an example, a superactive document 110 could start out in appearance somewhat like a form as it is initially generated from the superactive document design process. However, after some interaction from a user many elements could be changed, including the structure of the document itself. This capability does not exist in a traditional form. Nevertheless, the superactive document 110 is not as unstructured as a word processor document because the user 130 is not allowed to insert text or other objects in any fashion they choose. The editing experiences are subject to controls and authentications identified as part of the superactive document design process.

The interactive edit process (see FIG. 9) allows for manifestations within the superactive document 110 such as format changes, content changes, adding pages, deleting pages and an interview process. In an interview process, for example, the user could fill out an interview sheet before the superactive document 110 reformats itself. Possibilities for different manifestations are dependent upon the superactive document design process, and are limited only by the design choices. The design process could allow for anything within the superactive document 110 to be open for change by the end-user, or for nothing to be changeable, or anything in-between.

The superactive document 110 realizes a continuum between a static form application and an ad hoc unstructured application such as, for example, word processing. Traditional billing applications have a lot of variable data and also span multiple pages, thus the form is more fluid in a static form but not nearly so much as in a superactive document 110 where an end-user would be able to manipulate and change the structure of the document.

As another example, an insurance policy 158 is much more complicated than a standard form; the insurance policy 158 can cross multiple pages, can have multiple content sources coming into the policy and can have a large amount of variable content based on the individual customer. Capability for such a document would fit somewhere in the middle of the continuum between a static structured form and an unstructured word processing type application. Superactive documents 110 allow for creation of these types of forms, but also allows them to be more interactive and tailored based on the interactive edit experience. Whether creating a billing statement, an insurance or other type policy, or a direct marketing piece, the interaction allows for changes to the superactive document 110 in an interactive fashion rather than merely in a batch environment.

Once the user 130 has managed the interaction with a superactive document 110, then the document can be saved and re-stored as superactive doc 2 T(2) 136. Once the superactive document 110 has been created and interacted with, all things that have transpired within that interactive environment are fed back into the superactive document 110 format, including the changes that have occurred during the user interaction and user input. These changes could be additional images, additional overlays, additional data, additional customer transaction elements, additional formatting controls and additional user rights. Any or all of these changes could be brought into the superactive document 110 as part of the interactive environment.

Sourced data, as illustrated in the lower left quadrant of FIG. 1, is pulled into the superactive document 110 through network 140 connections to enterprise data 142, external data 144, or other information sources 146, such as the world wide web, streaming input, or update tickers, for example. It should be noted that many asynchronous data sources could supply data input to the superactive document 110. The sourced data can be continuously changed outside of the user's 130 influence or design, and thus the superactive document 110 may change as the sourced data changes.

The superactive document design process may allow for sourced data through initial content and initial instance data, and also through user interaction during the transition from the initial superactive doc 1 T(1) before 134 to a later version of the superactive doc 2 T(2) after 136. During the interaction with the superactive document 110, the user might require additional data sources to come into play. Data could be provided from the network external enterprise data 142 as well as data from any other information source 146 coming into play as part of that interaction. In other words, if a customer interacting with a superactive document 110 desires to change data from U.S. data to international data for a financial analysis pie chart, that data might be drawn from a network, or from an external or internal data source that then will be applied to the superactive document 110 format, rendered and manifesting itself on the screen of the superactive document 110 user. This is all transparent to the user because this functionality was set up originally in the superactive document design environment, to enable those types of things to occur.

Enterprise data 142 is available in-house, for example, content management system, database, system with flat data, among others. A typical example of enterprise data 142 would be transaction data where a customer is interacting with a billing statement.

External data 144 could be similar to enterprise data except that the data is stored externally. For example, data from a marketing center that a user wants to import or additional transaction data from a cross-marketed company, would be situations where use is made of data that is not available in-house.

As an illustration, company A has enterprise data relating to its customer usage patterns, while company B might have data (external to company A) regarding typical purchasing patterns of customers that match those usage patterns, and that data is not available within the enterprise of company A. If company A desires to create a customer communication offering special discounts for products that match the purchasing patterns corresponding to the company B data, then that external data 144 could be pulled into the superactive document 110 as part of the customer communication being created.

Of course, it should be understood that the data, whether from enterprise data 142, external data 144, or from another information source 146, could be content such as text, graphics, controls or sounds.

Asynchronous data from some other information source 146 could be provided from a network, a web application, or streaming input, among others. The superactive document 110 allows for data that isn't stored anywhere and provided interactively or asynchronously in the interactive process. Data could be provided through an interactive process such as live interaction, a service representative on the phone supplying live data, or a service oriented architecture (SOA) process from an external source.

For example, information could be received from a search engine, a totally unstructured search, that would come into this environment as another data source 146 that is then structured and incorporated into a superactive document 110. The data does not become stored data, but is rather the result of an operation outside the enterprise that is then applied into a network environment and drawn into the superactive document 110.

As a more detailed example, a live stock transaction ticker could provide asynchronous data as another information source providing live data over a network connection. A broker could send a communication to a prospective buyer for a particular stock by including the most recent stock information live to put into that communication. If the note were a live Internet communication, then the stock information (other information source 146), such as price, volume, 52-week high, among others, could be received from Wall St. and included in the communication along with the broker's own preformatted data (enterprise data 142) and data from the company itself (external data 144). All three data sources would be included simultaneously in the superactive document 110.

Any data sources that are available, including traditional sources and sources enabled through interactive processes over the web, may potentially be included within a superactive document 110.

The superactive document 110 itself is highlighted in the box at the center of FIG. 1, and is a high-level extrapolation of what is described in the logical format (see FIG. 7) and physical file format (see FIG. 8) in greater detail below. The sourced data coming into the superactive document 110 corresponds to data provided over a network to populate content objects that are described in more detail below. The content objects could be populated from enterprise data sources, external data sources, or other information sources.

As another interaction point, a user interacts with the superactive document 110 to create instance data 118, the data that fills variables and other content that have been set in the superactive document design environment 120. For example, a user 130 might enter their name as a CSR, and begin to personalize a letter to be sent to a customer they have been working with over the phone. The customer will provide the CSR with information that the CSR will then enter into the superactive document 110. The CSR could also add other necessary information, and perhaps change some imaging within the superactive document 110, for example. As a result, the instance data 118 that is changed as part of the interaction is also stored and filed in a logical format (see FIG. 7) represented by the doc store 138.

An orchestration component 114 operates to orchestrate the process as the user 130 proceeds through interaction with the superactive document 110. The orchestration process may, and often will, coincide with other content changes, such as changing instance data 118 or populating variables, for example. In orchestration, as depicted in the upper right quadrant of FIG. 1, the arrow between superactive document 1 (before orchestration) and superactive document 2 (after orchestration) signify the controls and the orchestration of those controls that exist as the user interacts with the superactive document 110. The orchestration, for example, could be interview forms that appear when a user 130 first opens superactive doc1 T(1) 134 requiring a form to be populated before any further interaction can occur with the superactive document 110.

For example, orchestration might indicate the high level goal of this superactive document 110. The high level goal could be to create a marketing piece, a letter, something tailored toward a particular type of customer, or toward a particular type of geography, for instance. A survey related to the goal could open at the beginning of the orchestration process. Once the user 130 completes the survey, then the next level of the superactive document 110 could be generated and tailored to the responses just entered. The changes in the superactive document 110 could be generated after the survey is complete, but could also change after a relevant portion, or form, for example, of the survey is complete.

The user 130 may continue to interact with the superactive document 110 in a number of different orchestrations. For example, free-form text could be entered, drop-down menus could help a user fill in different portions, or scrolling over an object could cause a menu to appear allowing selection of items from the menu that appears. The orchestration controls the evolution of the superactive document 110 as it transitions from one instance to the next during end user interaction and subsequent reformatting as part of an interactive edit experience.

The manner in which a user can orchestrate with the superactive document 110 is set in the superactive document 110 design process. The content component 112, control component 116, the orchestration component 114 and the instance data 118 are each defined in the superactive document design environment 120. They are then utilized and manipulated by the user 130 in accordance with the design. Any actions taken by the user 130 interactively are dictated by the design. The user 130 interaction with the superactive document 110 according to the limits defined by the orchestration component 114 drive the changes in the structure and content of the logical file format (see FIG. 7 below).

The control component 116 of the superactive document 110 provides capability for controlling user access rights. During the design of the superactive document 110 via the superactive document design environment 120, controls and rules are added to dictate how the document will be orchestrated by a user. The control component is discussed in greater detail below in relation to FIG. 7.

Interaction with a superactive document 110 for the purpose of utilization processes are depicted in the lower right quadrant of FIG. 1. Superactive documents 110 provide an ultimate goal of fulfilling some particular process. The superactive document design environment 120 provides for development of the superactive document 110. User 130 interaction with the superactive document 110 could modify or change the superactive document 110 to a new form/format. Data sources are part of the design process as well as part of the user 130 interaction process. Utilization processes 150 are many and varied such as order fulfillment 154, a call center 152, manufacturing and inventory 156, creating an insurance policy 158, printing 160, and mail 162, among others. A given utilization process 150 can be varied based on organizational need and many processes may be simultaneously executed as a result of their interaction with the superactive document 110.

For example, a utilization process could require the creation of a document such as an insurance policy 158. The overall goal of the process could be to actually create the policy, print 160 it and deliver it to a customer via mail 162 within two days. While this process may exist today in some manner, a superactive document 110 in an interactive environment could improve the policy application process and help render the policy more effectively in terms of how the policy is created and tailored to an individual. Even so, the traditional output process might remain the same.

Another example of a utilization process could be an order fulfillment 154 process where someone interacts with a superactive document 110 and part of that interactive process might spawn another process to order a product. An interaction with a financial services document might produce a survey response that triggers a request for additional information on a new fund or a prospectus on a potential company. The interaction with the superactive document 110 might spawn a process that prints 160 a prospectus and sends it to a customer. The separate document is not part of the superactive document 110, and yet is created by a process separate from the superactive document 110, but it is still generated through the superactive document 110 and the interaction with the user 130.

Still another example of a utilization process might be physically ordering a product as part of the superactive document process 100. For example, a CSR might receive a telephone call about an invoice problem. The CSR opens and interacts with a superactive document 110. While on the phone, the customer decides to buy an additional product beyond the one from the invoice. An entire retail distribution process could be spawned from the superactive document 110. The data could also be stored for future use. Also, customer data unrelated to the current superactive document 110 in an interactive sense (not what is currently at issue) might still drive another process such as order fulfillment or an ordering process.

Utilization processes 150 might also provide feedback to the superactive document 110. For example, after an order has been completed and the product has been sent to the customer, that same data might be applied back to the original superactive document 110 and stored in its content and available on the next occasion the superactive document 110 is opened to indicate this order by this customer. Such information could be useful within other processes such as, for example, a recall due to defective products.

Typically, user 130 interaction with a document that spawns a process such as order fulfillment does not carry beyond the closing of the document. The user 130 may have finished the order and closed the document. Of course the document is still in existence. For a superactive document 110, once the order happens, the data is fed back into the superactive document 110, including other processes such as delivery, or signature of receipt, for example. The remaining data is also fed back into the superactive document 110 so that even though the order had been placed and no further information was available, upon reopening the superactive document 110 information such as delivery time, for example, could be available. The user's 130 return finds updates to the superactive document 110 complete such that the user 130 does not have to initiate any action to find, for example, whether a delivery was made.

The superactive document 110 functions more like a container of information. Some of the information in it can manifest itself as a document, while other information can be used to drive other processes, and still other information might not ever be used. In that sense, the superactive document 110 is a container of a document process that will follow through subsequent process and will be updated accordingly as the user 130 navigates those processes.

The superactive document 110 is more than a document, but is a superactive container. Items in the container provide tools that can be used to create a document. But the items might also be used to drive other processes, that might have nothing to do with a document. A superactive document 110 allows someone to create a process application (in the superactive design environment) that manifests itself as a document through the process.

The superactive document 110 provides a context, a container that carries through business process management, for example. The superactive document 110, or container, manifest itself as a document, allowing the customer to view it as a document. The superactive document 110 is allowed to become the process. Interaction with the superactive document 110 could become the process.

Upon user input, the superactive document 110 is utilized for fulfillment of processes such as order fulfillment 154, manufacturing/inventory 156, insurance policy 158, printing 160, mail 162 and customer service such as call centers 152. Feedback from utilization processes 150 serves to continually update the superactive document 110 as well.

FIG. 1 illustrates how the superactive document process 100 works and the data structures underneath this process that enable it work in the manner described. What follows is discussion about the application sense of the superactive document 110 and how it is useful.

Figure 2:
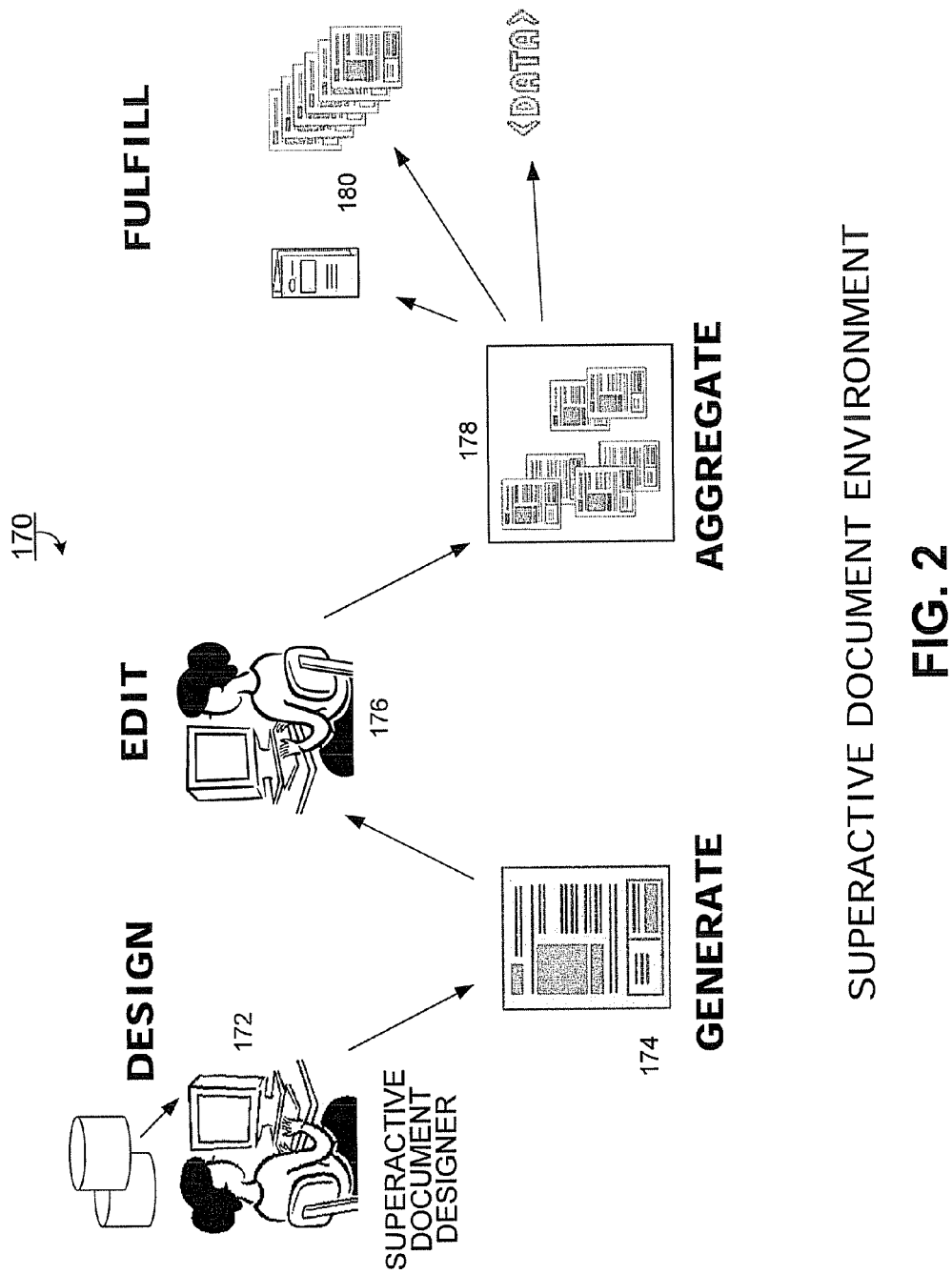
FIG. 2 is a high-level overview of the exemplary superactive document processing system of FIG. 1 according to aspects of the present invention.

FIG. 2 illustrates an embodiment of the superactive document environment 170 and is a high-level and simplified representation of a sub-set of FIG. 1. Arrows indicate the flow through the process. The superactive document designer 172 is the individual designing the original superactive document 110 utilizing the superactive document design environment 120. The superactive document 110 will typically be physically designed by someone. An automated design process could of course be implemented to serve the same purpose.

After the superactive document design is complete, the first instance of the superactive document 110 is generated. The superactive document 110 is represented as a document to the end-user. The newly generated result 174 becomes the first instance of the superactive document 110, which is then read into an editor. As illustrated by EDIT caption 176 in FIG. 2, the superactive document environment 170 allows for changing the document, aggregating documents, modifying format, and adding additional content, among others, as discussed above in relation to FIG. 1. Aggregate 178 is a combination of bringing in additional data sources as well as things that occur through the interaction steps. For example, as part of the superactive document environment, additional data might need to be aggregated as additional pages of this document, or an outside chapter could be needed that comes in as part of the interaction to a book. Aggregation is really a combination of the interaction and additional data access that combine to create this aggregated new document. The fulfillment 180 (utilization processes) could, for example, send out a document, multiple documents, or raw data. The file format outputs could have multiple pages, multiple documents, or multiple data sources, that could then drive additional fulfillment 180 processes. Of course, if the fulfillment 180 process is just to generate a document then it would be finished at this point.

Figure 3:
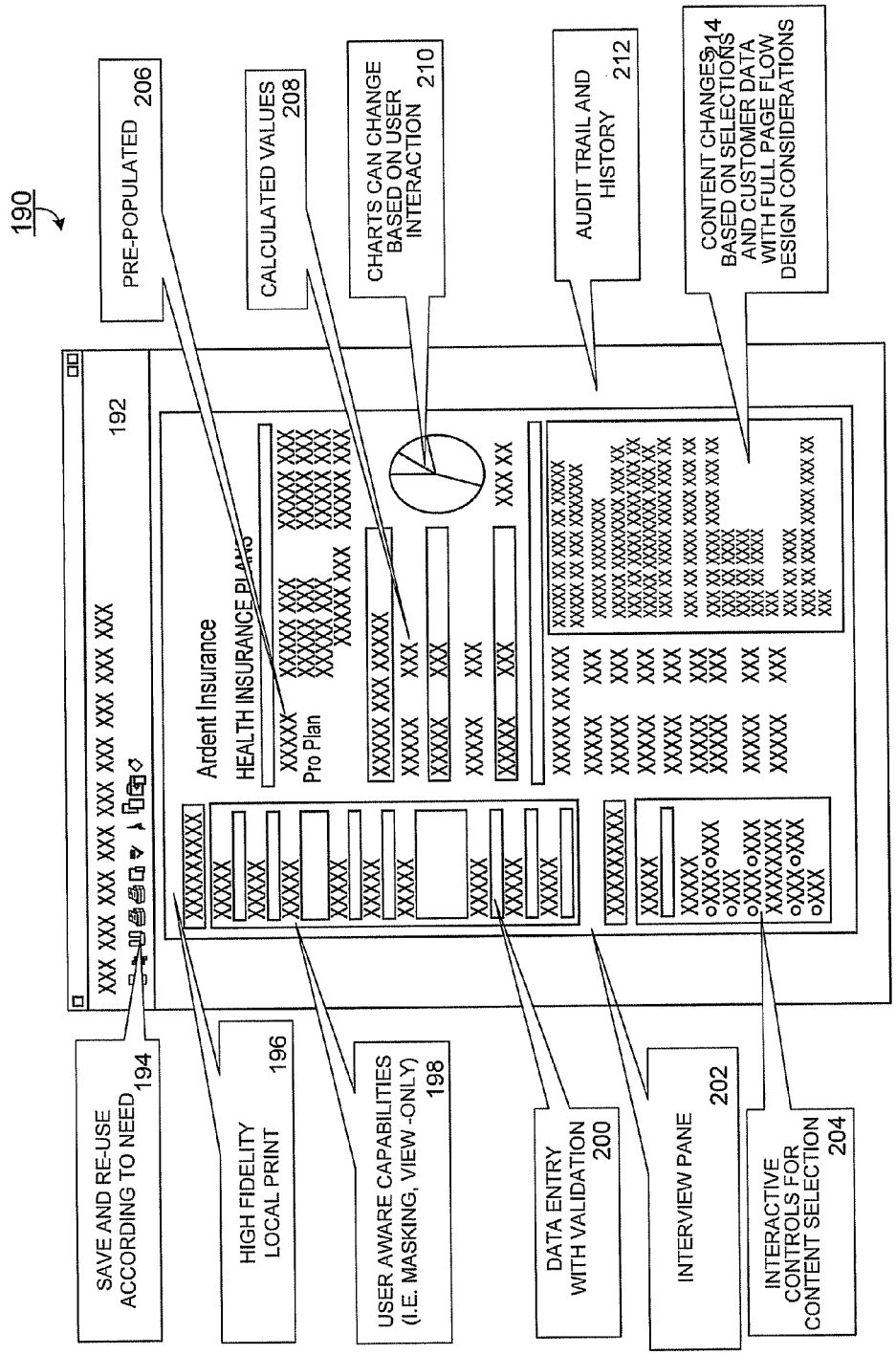
FIG. 3 is an illustrative representation of the screen appearance of an exemplary superactive document of FIG. 1 according to aspects of the present invention.

FIG. 3 is an illustrative representation 190 of the screen appearance 192 of an exemplary superactive document 110. As a user 130 proceeds through a superactive document process 100, the user 130 experiences familiarity with what appears as any other document. This superactive document 110 will appear on the user's screen in some fashion resembling a standard document, whether word processing, forms, PDF, or more likely, a combination of these and other document types. The superactive document 110 is more than a form, but also has controls and thus, is also not as free-flowing as a word processing document. This paradigm of a form/document/PDF/etc. allows the user to interact with this document in a controlled fashion whereby it becomes much more than a PDF form, and much more controlled than an unstructured word processing document. Many of the components visible on the screen can change as part of an interactive document experience. The user would see objects available on their screen which have the types of functionality that would be expected to be associated with them.

The left side of the screen can be thought of as an interview pane 202, an overview, or an overlay. It should be noted however, that an interview pane is not limited to a particular location within the screen appearance of the superactive document 110. The interview pane 202 could just as easily appear on the right, top or bottom, could be a pop-up window of varying sizes and shapes, or could even be a transparent window covering all or part of the screen, again in varying sizes and shapes. The interview screen may ask for specific information as part of the interview process. The items initially available in the interview pane 202 may correspond to the information inserted into the initial iteration of the superactive document 110 during the design process. The initial iteration of the superactive document 110 will manifest itself prior to any user interaction. For this example, the user interaction will normally take place on the right side of the screen amongst the whitespace. However, that user interaction might not occur (depending upon design restraints) until some amount of information has been provided to the interview pane 202.

The interview may be as varied as the designer/users 122 that design it. Interview questions may vary from asking for the controls for content selection (assuming the user is allowed to specify them), asking for a policy number, asking when was the last communication with this customer.

Account or policy information, for example, could appear anywhere on the screen, or not on the screen, or it might require scrolling to be seen, or it could be a transparent overlay that sits on top requiring the user to enter the data before the document can be seen. Depending on the design, the user may not be able to see the information at all, and may not have an option for interacting with it. The information could also be pre-populated such that the user does not have an interview pane 202 because no interview is required, and the user has no flexibility to enter any information and thus, is only allowed to work with the available information on the right side (in this instance) of the screen.

A control to save and re-use according to need 194 could provide controls allowing or not allowing a user to save the superactive document 110. Also, circumstances could exist where a user is not allowed to modify the superactive document 110. The purpose in such a circumstance would be to collect the data that is input as part of the interactive experience. This functionality is closer to a classic form environment. The form cannot be changed and the data is collected and used. The user cannot save the data for re-use because they are not allowed to do so.

A control for high fidelity local print 196 allows control over whether a user may print the superactive document 110, whether printing can only be performed in batch, whether the superactive document 110 may only be displayed electronically, or created as a PDF or any other output format. Fidelity of the print may also be controlled, as well as color for a direct marketing piece versus black-white for a statement application. These controls allow for selection of printing fidelity during the interactive experience, or to prescribe that for a certain superactive document 110, only a certain way will suffice.

A control for user aware capabilities 198 allows for users to have capabilities to define what they may see and what they can edit within the superactive document 110. Of course, this operates within a framework of the original design allowing the user to have that capability as to certain content. Additionally objects or content could appear in different locations based on the user identity, title or role within the enterprise. Additionally, of course, this capability could be extended based on groups, authentication, or other factors as well.

A control to allow for data entry with validation 200 may be used to specify which users may enter certain data. For example, only certain users may be allowed to edit a particular box. Part of the validation would be that some are allowed to edit while others are not allowed. Additionally, one user might be allowed to edit a box free-form while another user may be limited to pre-approved text or drop-down boxes. Also, a box could be limited to administration, data capture, or to spawn additional processes.

Another control could allow interactive controls for content selection 204 to determine the type of data that can be entered. In addition to limiting whether data can be entered at all, requirements could extend to specific data types such as state, phone number, etc. These types can also be validated for formats such as telephone number and zip code among others.

Some data, possibly large amounts, are pre-populated 206 from the design phase choices. Pre-populated data could be of many types including images, text, or from other data sources. Any type of data that could be represented in a final document could be pre-populated.

Calculated values 208 are also available in the superactive document 110. As a user interacts with the superactive document 110, numbers could be added into the document as part of the interactive experience (as allowed through the authentication process). Values may be calculated, pre-populated, or even post-populated if they are re-routed to another process.

In the superactive document 110, charts can change based on user interaction 210. A chart in the superactive document may be configured to change as the user scrolls over the chart. Or the chart may be configured to allow the user to select between multiple options based on user preferences or user interaction. For example, right-clicking on a chart could cause a menu to open which allows for changing the chart from 'Total Costs' to 'Total Revenue', for example. The ability to change a chart or structure is, of course, dependent on the design choices made in the superactive document design process. Further, the particular chart or box may be limited to certain types of charts.

Anything a user changes in the superactive document 110 can be recorded as audit trail and history 212. The audit trail and the history 212 of all the changes can then be fixed into the superactive document 110 and used for other processes or approvals, for example. This feature is useful for regulated activities where it can be necessary to verify the user that made the change, when the change occurred, why the change occurred, and how the change was made.

Additionally, content changes based on selections and customer data with full page flow design considerations 214 allow for all encompassing changes in format based on how the user interacts with this section of the superactive document 110. Parts of the superactive document 110 such as a chart could change where it is positioned based on how the user interacts with it. For example, the superactive document 110 could reflow based on an interaction that replaced the chart with another type chart, and then look nothing like it does in FIG. 3 currently. The whole format could change as part of the user interaction.

Still, the formatting could change only based on how the design was set up and how the authentication was set up. Unstructured design changes are still not occurring, but rather structured design changes that are only allowed based on the superactive document design.

While a document that appears as the one in FIG. 3 could be created in a word processor and still be totally flexible, it would lack the true flexibility in an interactive sense. Allowing a user the capability to change an entire document as in a word processor such as Microsoft Word could certainly occur. However, superactive documents 110 provide more control over the superactive document 110, thus allowing for auditing together with the additional features of a structured document.

Full page flow of the superactive document 110 could change as well as customer data could change. The data sources could change via someone typing in new data, but could also change because of a pull-down section that allows the selection of different paragraphs to be included in the document. Based on paragraph selections, for example, an entire superactive document 110 could re-flow in terms of its appearance. Additionally data from outside data sources could be reapplied and alter the flow of the superactive document 110. For example, a user could add another chart to the superactive document 110 using international data instead of domestic data. Multiple data sources and controls exist and could be allowed through drop-down content based or ad hoc data queries from live data sources, that are then folded into the superactive document 110 as part of the interactive experience. (These data source are represented in FIG. 1 where data comes in as a variety of different sources and is applied to the superactive document 110.)

Figure 4:
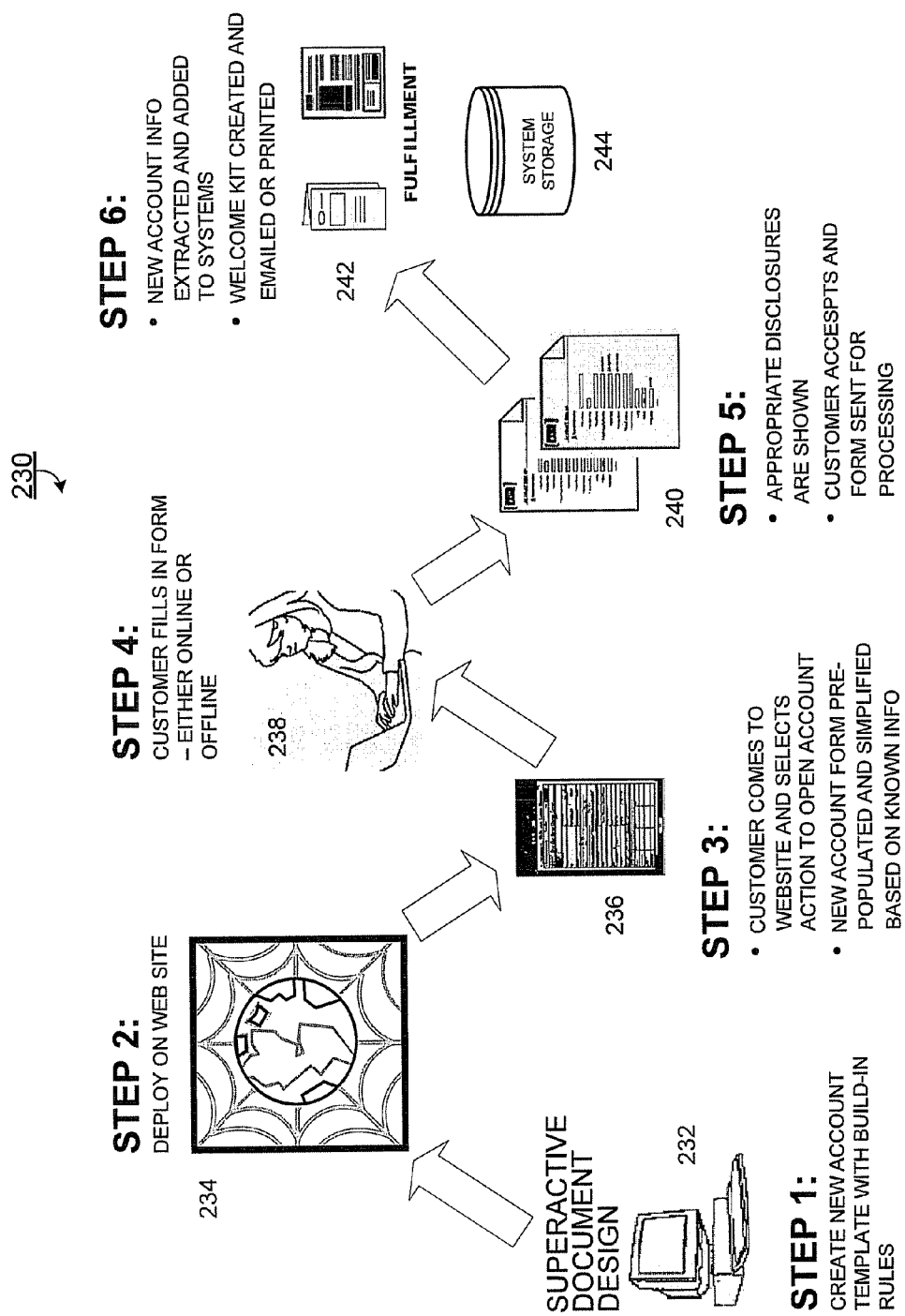
FIG. 4 is a flow diagram illustrating a customer interaction process utilizing the superactive document of FIG. 1 according to aspects of the present invention.

FIG. 4 is a flow diagram illustrating a customer interaction process utilizing the superactive document 110. The customer interaction environment 230 shows a customer interacting with a superactive document 110 to create a new account. In this instance, a form is placed on a web site, the customer interacts with the form, fills out certain parts of the form, and then the form goes through a fulfillment process and is sent to the customer via any of several delivery methods such as email, regular mail, among others.

The value is added to this process as the customer interacts with the superactive document 110. In the superactive document design phase 232, a new account template is created with build-in rules and deployed on a web site 234. A standard web form would be designed in much the same way, however the superactive document 110 goes well beyond the standard web form capabilities. The superactive document 110 allows the user to interact with the form rather than simply filling it in. Once the user interacts with the superactive document 110, it can change based on the interaction.

A customer accesses the website and selects action to open a new account. The new account form section of the superactive document 110 opens pre-populated and simplified based on known information. The form could apply to a 401k account, opening a user account, or applying for a credit card, for example. This is the first form that the user interacts with and is depicted at 236 in step 3. The customer then begins to fill in the form within the superactive document 110 at 238 in step 4. The user may actually change the superactive document 110 by changing the form or the form (and superactive document 110) may change based on how the user interacts with it.

For a 401k form, for example, the user could input data specifying where they now live, the company they are coming from, the company they are going to, and so on. The form within the superactive document 110 could change and become more simplified as the user proceeds through the interactive process. Typically, the user will interact with only the portions of a superactive document 110 that are relevant to them, thus simplifying the process. Costs and errors will also be reduced in the process.

Further, as the customer interacts at 238 in step 4, filling out information, the document changes and it generates the appropriate fulfillment mechanism. The appropriate fulfillment could be simply a 3 page document sent to the customer for signature, rather than a one-size-fits-all 20 page document where very few sections apply to any specific customer. Also, the document could be sent to the customer via regular mail, but could also be, for example, a PDF document created automatically in the environment so that the customer may print, sign and send immediately. Other fulfillment mechanisms could also apply, such as electronic signature for example. The superactive document 110 is not concerned as much with how the form interacts with other processes, but rather that it is allowing the form to drive some of the processes in the fulfillment.

It should be noted that customer automated approval and acceptance 240 (step 5) may be conducted by having the end customer interact with the superactive document 110 directly.

It should also be emphasized that the superactive document 110 can be the mailed or electronically delivered document 242 (step 6) or it might spawn another process which creates some other fulfillment item, with customer interaction environment 230 including system storage 244.

Figure 5:
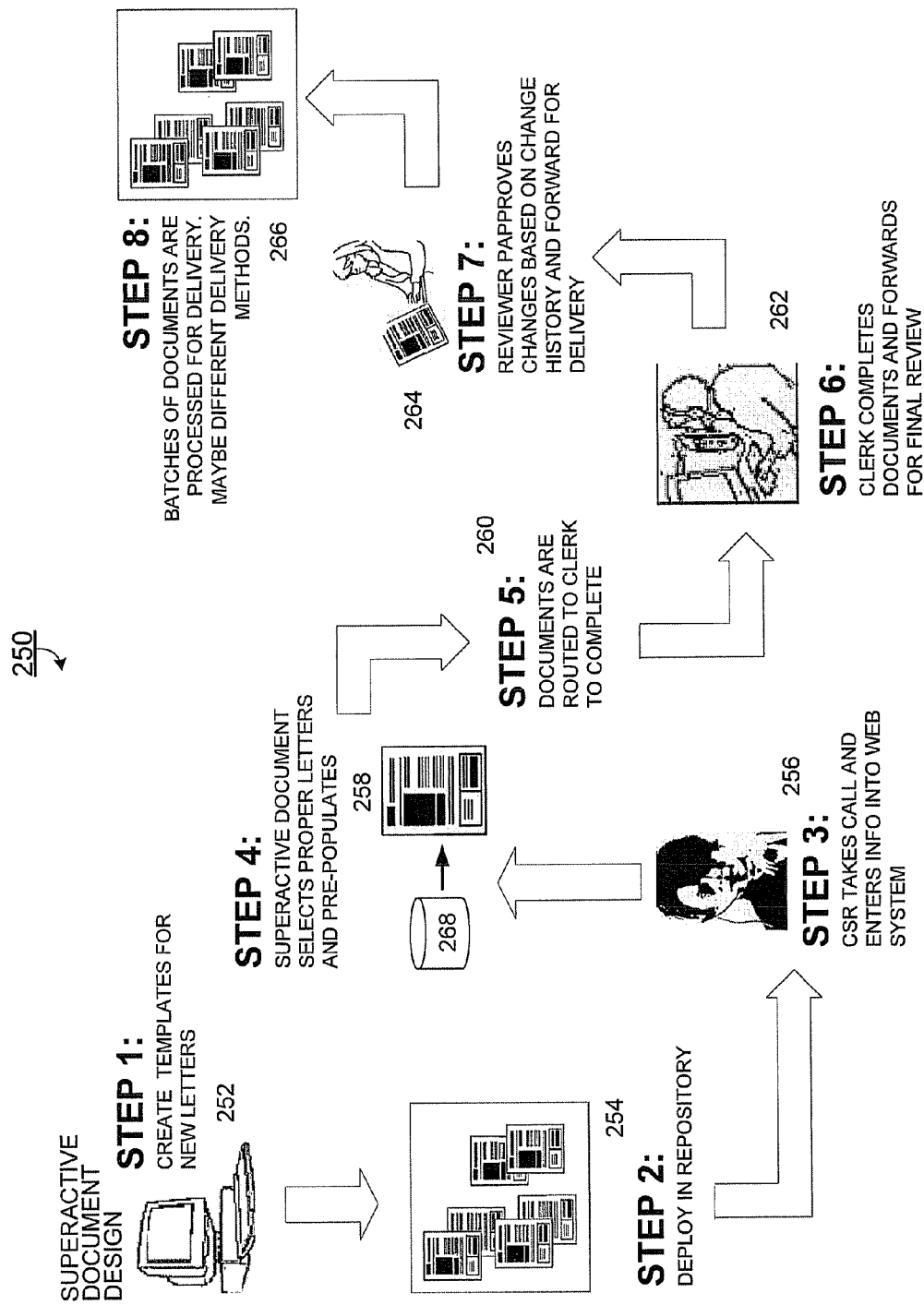
FIG. 5 is a flow diagram illustrating a customer service representative (CSR) process utilizing the superactive document according to FIG. 1.

FIG. 5 is a flow diagram illustrating a customer service representative (CSR) process utilizing the superactive document according to FIG. 1. The CSR environment 250 shows a CSR interacting with a superactive document 110 while receiving a call from a customer. Typically, the CSR will receive a call and enter the information into the system, the superactive document 110 will then select the proper letters for the particular customer situation and pre-populate. The final document is then reviewed by a clerk and a reviewer and then sent for delivery to the customer. Some variations will occur in these processes, but the general flow is typically the same.

In this instance, a call center for a manufacturing company receives a call from a customer with a complaint. Traditionally, a repository contains a multitude of letter templates for the CSR to select from regarding an appropriate response for a customer complaint. Multiple letter templates are also created in the superactive document design at 252 (step 1). Rather than store the letter templates in a repository for the CSR to select from, the letter templates are part of the superactive document 110 and thus, repository deployment at 254 (step 2) and creation of the templates at 252 (step 1) merge due to the superactive document 110 simplifying the process of responding to and addressing customer complaints. The repository becomes unnecessary, since the superactive document 110 changes based on user interaction.

The CSR receives the customer call at 256 in step 3, opens the superactive document 110, and begins to interact with the superactive document 110. As the CSR communicates with the caller and gathers information regarding the complaint, the CSR will be interacting with the superactive document 110 and entering information related to the particular problem the caller is having.

CSR interaction with the superactive document 110 may occur in many ways. For example, an interview form could lead the CSR through the process where the CSR obtains certain information from the customer, and each request for information could cause the superactive document 110 to adjust dependent on the nature of the response entered by the CSR. In another example, a pre-formatted correspondence letter could allow the CSR to add unique text related to the customer's concerns. In still another example, responses could also be selected from drop-down menus corresponding to paragraphs of text that are inserted into a letter in tightly controlled responses.

The superactive document 110 selects proper letters based on the CSR entries and pre-populates the document at 258 in step 4. This could result in a restructuring of the superactive document 110, as well as the addition of other documents or letters into the superactive document 110. These additional materials could be supplied by external or internal sources 268 as shown at step 4. It is important to note that the documents are being created, modified and/or changed as a result of the CSR interaction with the superactive document 110, and that these events are occurring while the CSR is interacting with the customer as well. The CSR does not have to enter the information and then wait for some other process to create the necessary materials at a later time.

Once documents are created, they are normally routed to a clerk as part of the reviewing process at 260 in step 5. A clerk will typically complete the documents and review any materials at 262 in step 6 before they are forwarded to the customer. This step could include adding materials to the document, adding documents, and/or adding pages, for example. The superactive document 110 simplifies the routing in step 5 because the document is already finished except for approval. Any additional materials are assembled within the superactive document 110. The clerk then only needs to receive or access the document, provide necessary approval and/or commentary and forward to a final reviewer or manager at 264 in step 7 before the document is sent to the customer. The documents may be sent to the customer in any suitable fashion, such as batch delivery via standard mail, or email, for example, at 266 in step 8.

FIG. 5 can thus be simplified to a three-step process containing two approvals in a customer interaction environment process. (1) A CSR receives a call, creates and interacts with a superactive document 110, which can thus be changed, modified or even have new documents added. (2) The superactive document 110 is sent a clerk for approval review. (3) Finally, the superactive document 110 is sent to a final reviewer that takes the superactive document and approves it for delivery to a customer.

The superactive document 110 allows for the immediate elimination of some steps in a CSR process and provides for significant automation of the remaining steps. A historical approach to such a CSR process would require storage of different possible letters and templates in a repository for ease of access by the CSR. The superactive document 110 eliminates the necessity of a repository because the letter modifies based on the conditions that the CSR experiences during a call. Thus step 2 at 254 can be eliminated.

The design process in step 1 at 252 creates a superactive document 110 which then, adjusts as necessary based on CSR inputs in step 3 at 256. The superactive document provides more than a document creation tool. It simplifies the CSR process.

Figure 6:
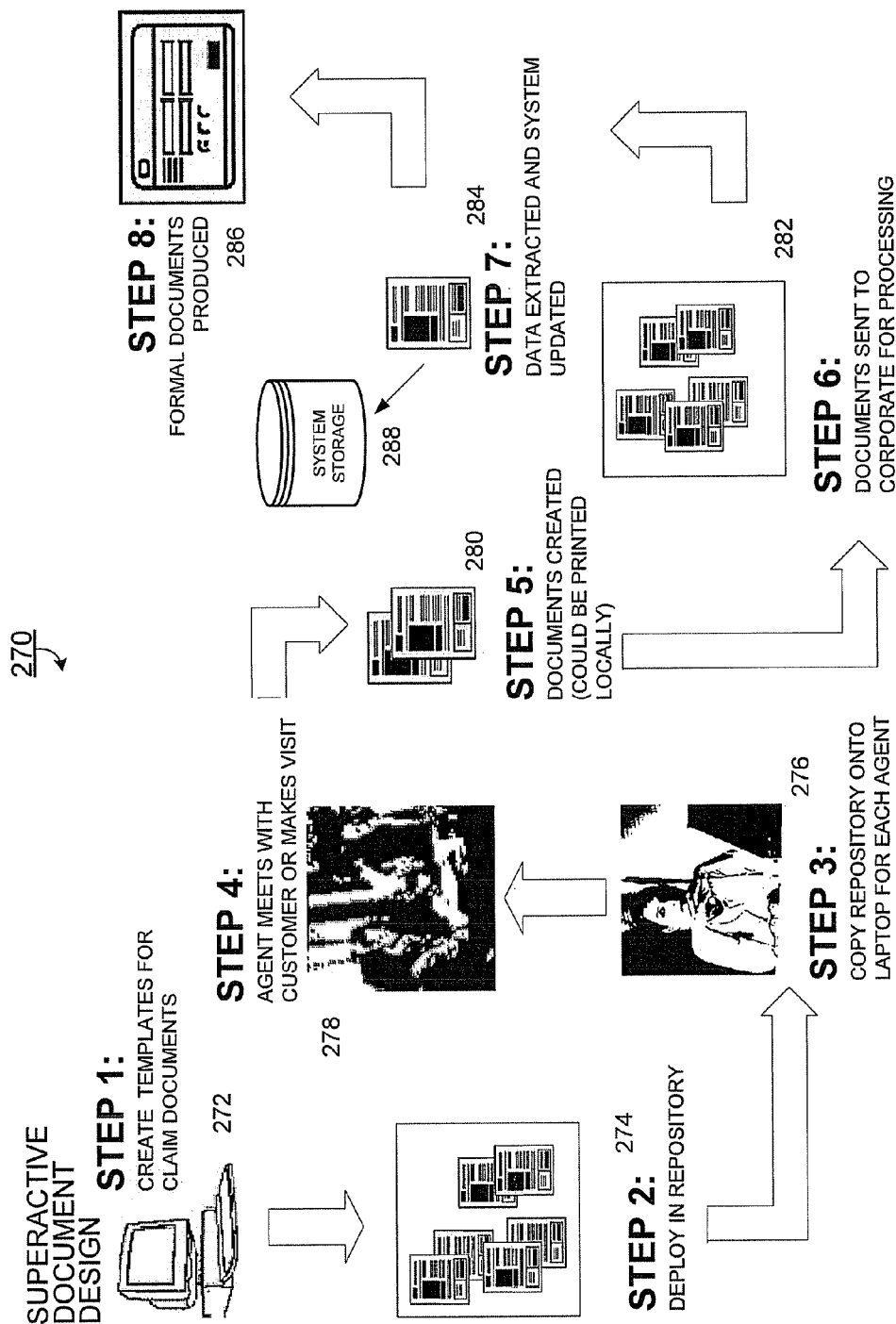
FIG. 6 is a flow diagram illustrating an insurance agent process utilizing the superactive document of FIG. 1 according to aspects of the present invention.

FIG. 6 is a flow diagram illustrating an insurance agent process 270 utilizing the superactive document according to FIG. 1. The insurance agent environment shows an insurance agent interacting with a superactive document 110 while meeting and interacting with a customer to file a claim due to damage. At 272 (step 1), templates for claim documents are created in the superactive document design phase. These templates are incorporated into the superactive document 110 that will be utilized by insurance agents as they proceed with the claim filing process. Traditionally, as noted above regarding FIG. 4 and FIG. 5, the insurance claim templates would be stored in a repository 274 (at step 2) from which the agent could then select the appropriate documents as necessary. However, the superactive document 110 eliminates the need for a repository. One superactive document 110 replaces the repository and allows for creation of the necessary claim forms as the agent interacts with the superactive document 110 and the customer. The insurance agent could have access to the superactive document 110 via a laptop with Internet connection 276 (step 3), for example, or the superactive document 110 could be similarly manipulated in a non-connected environment.

An agent will typically interact with the superactive document 110, while meeting with a customer 278 (step 4). During this interaction, the necessary information relating to the claim will be entered into the superactive document 110. For example, an interview process would appear within the superactive document 110 prompting the agent to enter necessary information such as, what has happened?, or what type of loss has occurred?, for example An interview overlay might open immediately upon opening the superactive document 110 while sitting with the customer. Upon entering the necessary information, the superactive document 110 will adjust the document as necessary in response to the entered data to create the final output of the documents 280 (step 5). The option exists to print the documents locally at this point. Of course, a PDF could also be generated and given to the customer while meeting with them. Many alternatives exist for delivering the documents to the customer and the methodology of that deliverance at this point is not so important as the capability to do so.

A traditional process would send the documents to corporate for processing 282 (step 6) to include data extraction and system updates 284 (step 7). The extracted data would be stored 288 and the formal documents would be produced 286 (step 8).

The superactive document 110 allows the creation of corporate approved, corporate regulated, final form documents that are generated in the customer's presence and that can be printed and signed immediately. The need for fulfillment processes that require forwarding the documents to corporate for approval prior to the customer receiving a policy, for example, can be eliminated. The policy can be created in the customer's presence and be ready for signature, including physical signatures and electronic signatures.

The steps for forwarding documents to corporate for processing 282 (step 6) and data extraction 284 (step 7) are absorbed into the agent's interaction with the superactive document 110 during the customer visit 278 (step 4). The superactive document 110 allows for the creation and filing of an insurance claim while also simplifying the process.

The above process allows for the capability to leave a signed policy or claim with the customer. Of course, if for regulatory or other reasons, certain documents must still be delivered to the customer after some corporate processing, then the information can still be uploaded from the superactive document 110. Additionally, all data that was entered during the customer interaction may still be extracted from the superactive document 110 to populate other data sources or to spawn other processes. The superactive document 110 has a container of all the interaction activity that occurred during customer interaction 278, and that data may extracted and stored into another data system or re-purposed for another process, or even used to create other documents that are required to be delivered later.

Data extraction and update is totally automated 284 (step 7). Historically, an agent would meet with a customer, fill in the forms, and then the data would be re-entered into another system later. A separate application would typically retrieve the data and store it into separate databases. Dual entry and re-entry of data, as well as manual intervention processes, can be eliminated through use of the superactive document 110. As the data is entered initially, it is already extracted and prepared for upload.

Figure 7:
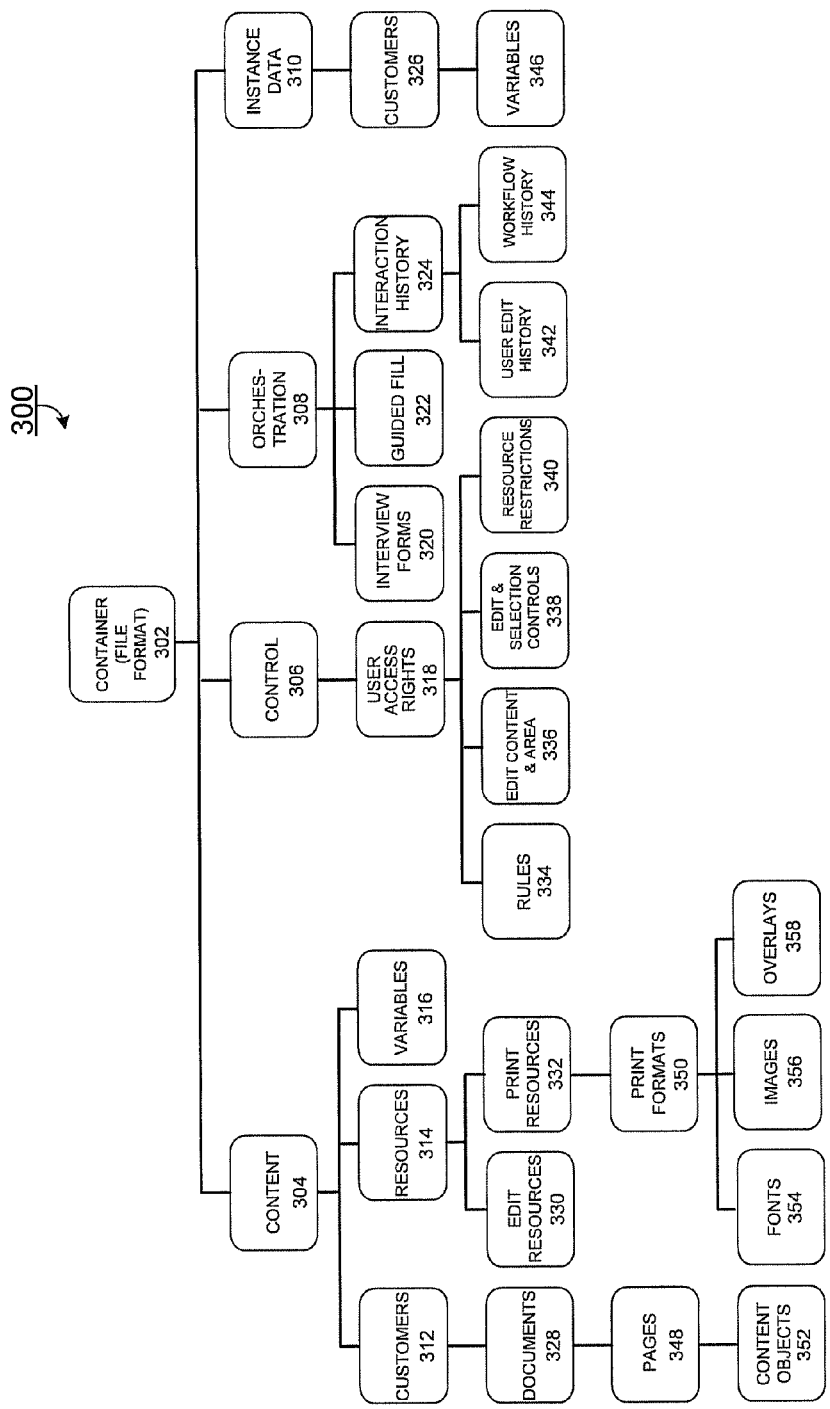
FIG. 7 is a block diagram illustrating the logical file format of a superactive document of FIG. 1 according to aspects of the present invention.

FIG. 7 is a block diagram illustrating the logical file format 300 of an exemplary superactive document 110 according to FIG. 1. The four components of the superactive document 110 are present in the container 302 shown in logical file format 300. The container 302 encapsulates four fundamental areas, or components, within a logical file format 300. These areas, content 304, control 306, orchestration 308, and instance data 310, provide the underlying infrastructure of a superactive document 110.

Content 304 and control 306 are created in the design process and utilized within the interactive edit experience as part of an orchestration process which may involve the addition of instance data 310. The orchestration 308 component drives the orchestration process.

The content 304 exemplifies the elements associated with the content and the design of that content in the original instance of a superactive document 110. This content may involve documents 328, pages 348, and content objects 352, as well as the resources 314 and variables 316 attributed to that content.

The control 306 section of the container 302 contains the user access rights 318 and all of the elements that these access rights 318 monitor and control. User access rights 318 will encompass how a user navigates through the interactive edit experience and how they will utilize the content 304. The rules 334, edit content and area 336, edit selection controls 338, and resource restrictions 340, are all elements of control 306 that will limit or enable a user to navigate through the superactive document 110.

During the design of the superactive document 110, rules 334 are added to dictate how the document will be orchestrated by a user. For example, some of the user access rights 318 might be the rules 334 that accompany the document. A rule 334 could be as simple as stating that if this document is being addressed to someone in Kentucky, then it should contain a certain type of content 304. Similarly the edit content and area 336 for particular content 304 would be defined. In other words, a certain edit content and area 336 would correspond to a certain content 304. The same would hold for defining edit and selection controls 338 and resource restrictions 338 in relation to particular content 304.

Instance data 310 refers to data that has changed as part of the interactive edit experience. This data is used to fill variables 316 that were designed in the original instance of the superactive document 110 and that were originally placed in the content 304 variables 316 components. Instance data 310 can be segmented by customer 326 and by the variables 346 that were changed as part of that specific customer interaction. The customers 326 and variables 346 contain a set of variable updates that occurred during an interactive edit experience. For example, one set of instance data 310 might have customer A variable data changed to reflect a new address, or a new telephone number would be stored as variable 346 instance data 310 under customer 326. In another instance, data for customer A might be changed by an additional user in an interactive edit experience to modify a birthdate or zip code resulting in another set of variable 346 instance data 310. Therefore two separate sets of instance data 310 could exist for one customer 326—which are different from the original variables 316 and original customers 312 that were defined as a part of the superactive design process—based on two separate interactions with the superactive document 110. The original population of the variable data 316 which resides in the content section may have been filled in as part of the original superactive document creation process or may have been a blank variable to be filled in during the first use of the superactive document 110.

The orchestration 308 contains elements and constructs allowing a user to navigate between content 304, control 306, and instance data 310, during interaction with the superactive document 110 in the interactive edit experience. Orchestration 308 may include interview forms 320, guided fill 322, interaction history 324, or a variety of other interaction methods that are used as part of the orchestration process. The interaction history 324 can exist in several formats and methods. As depicted in FIG. 7, this interaction history 324 could be a user edit history 342 that tracks how each user interacts with the superactive document 110 during the interactive edit experience. The workflow history 344 can be utilized to understand how the superactive document 110 has progressed through a workflow. One such workflow could be an approval process where multiple individuals are required to sign off on a document before it is presented to an end customer. In this case the workflow history 344 would show and indicate who has approved a specific document during the workflow.

The power of the superactive document 110 and its subsequent processing in the interactive edit experience can be manifested in how content 304, control 306, orchestration 308, and instance data 310 come together as part of the user interaction in the edit experience. For example, the original content and original formatted template created in the original superactive document design phase can enter the user interactive edit experience with a set of content variables 316 and resources 314 already defined. Each of the embodiments of the document will be represented in this content architecture. For example all possible images that may be utilized by an end user in the interactive edit experience may be defined in the content objects 352 section. The preliminary format at the documents 328 and pages 348 may already be predefined as part of the template created during the superactive document design phase. Resources required to edit (edit resources 330) and print (print resources 332, including print formats 350, such as fonts 354, images 356, overlays 358) the document have been predefined as part of the design process as well and represent themselves to the users and changes part of the user interactive experience. The variables 316 are defined during the design process and may be pre-populated with discrete customer information before the first instance of the superactive document 110 is used in the interactive edit experience. Once the original design has been created, the content structure, resources 314, and variables 316 will have been identified and incorporated into the initial design.

The control component 306 would also be defined as part of the superactive document design process. In the edit and selection controls 338 component for example there might be predefined themes or skins which can be utilized by an individual user to custom tailor the appearance of their interactive edit environment. The rules for specific document may include how items are formatted or where data is collected from, and are also defined as part of the superactive document design process.

A primary benefit of the superactive document 110 is that content 304, control 306, and instance data 310, come together as part of the interactive edit experience. The method by which these come together takes place in the orchestration 308 component of the container file format. As a user interacts with the superactive document 110 in the edit environment, much within the logical file format 300 will be affected. The first phase of the interactive edit experience may be to fill out an interview form 320 which will set the preliminary appearance and data population of the superactive document 110. In this process, the user may select attributes in the interview such as which type of currency could be used, which type of headings should appear in the document, or which types of charting should be used within the document, and the superactive document 110 will be rendered to fulfill the appearance suggested by this interview form 320.

Another possible orchestration method would be guided fill 322. In this scenario the user will select specific content based on a drop-down menu or some other selection methodology. This predefined content would actually reside in the content objects 352 and may have several instances of content that might be utilized as part of the drop-down menu. In this situation the user is not creating free-flowing text but rather utilizing selected information that has been previously prepared and preconditioned during the design of the superactive document 110, and stored in the content objects 352.

Still another method for populating text within a superactive document 110 would allow the user to type in free-form text as part of the interactive edit experience. This free-form text would become part of the instance data 310 and stored as a variable 346 accompanying the customer 326 specific instance data 310.

Throughout the orchestration process, user access rights 318 and rules 334 may be utilized to enable the correct regeneration of the superactive document 110 as it proceeds through the interactive edit experience. Resource restrictions 340 may also dictate content objects 352 and other elements that would not be permitted for an individual user to access.

Figure 8:
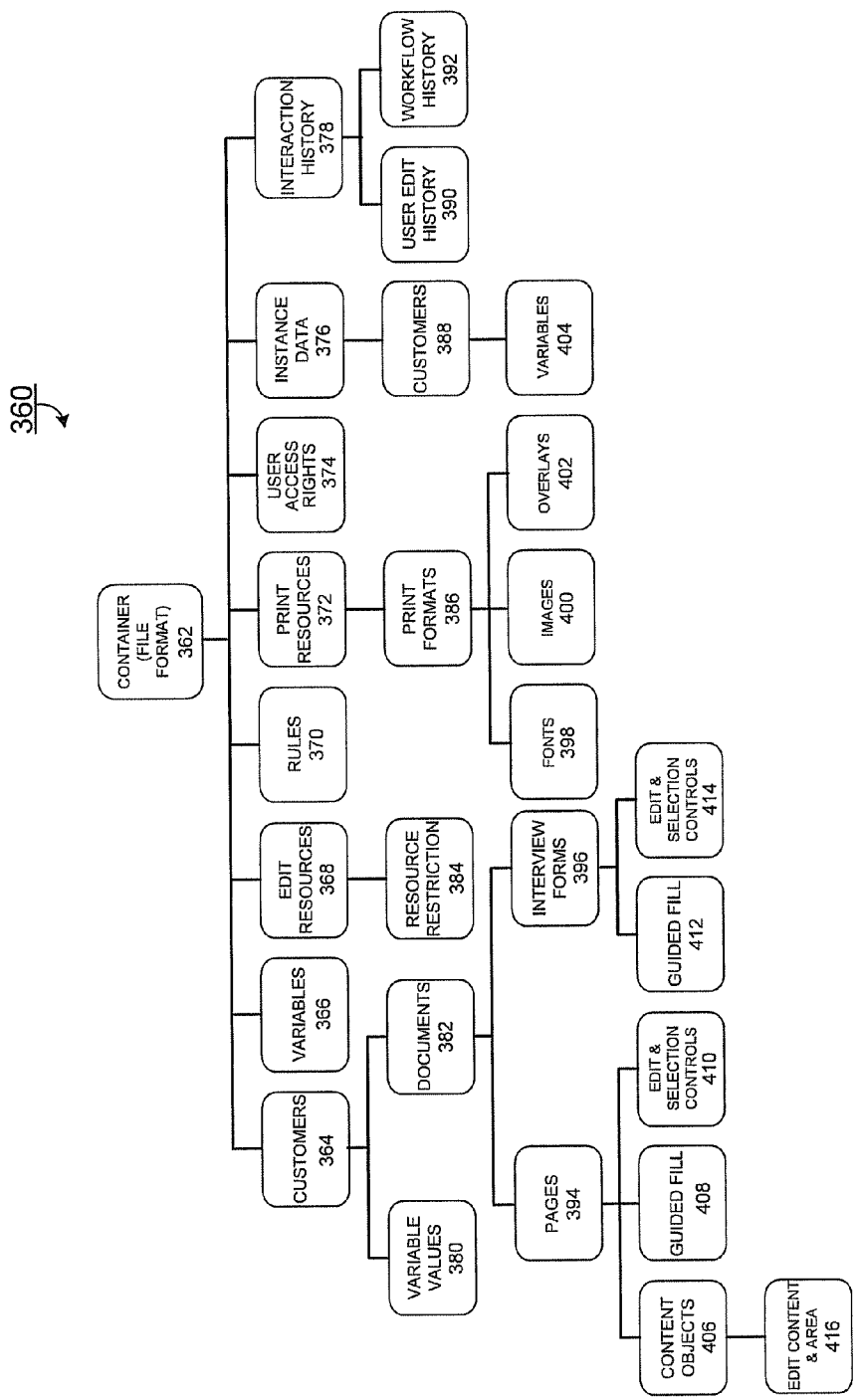
FIG. 8 is a block diagram illustrating the physical file format of a superactive document of FIG. 1 according to aspects of the present invention.

FIG. 8 is a block diagram illustrating the physical file format 360 of a superactive document 110 of FIG. 1. A container (file format) 362 has a first level hierarchy which stratifies the file components based on three primary attributes—cardinality, usability and persistence. From a cardinality perspective, the container 362 has several levels of hierarchy resulting in sub-setting of file components based on their usage. This hierarchy also dictates the persistence level of each component within the container 362. Finally, from a usability perspective, the physical file format 360 allows other processes to access and utilize superactive document 110 data in a concise fashion. Within this first level of hierarchy, the variables 366, edit resources 368, rules 370, print resources 372, user access rights 374, and interaction history 378 components are common for each superactive document 110 instance. The customers 364 and instance data 376 represent data that will be changed as part of a user interactive edit experience.

Variables 366 are the discrete variables incorporated into the superactive document 110 as a part of the design process. Variable values 380 are specific customer data points that are associated with the variables 366 defined in the designed superactive document 110. Variables 404 represent changes to the variables 366 that occur during the interactive edit process as the user navigates through the interactive edit experience, thus altering the data originally placed in the content associated with the customers 364, denoted as variable values 380. In this instance, the variables component designated as 366 were the design variables and variable values 380 and variable values 404 are the values associated with the design variables. The variable is depicted as variable values 380 with a first set of customer variables that were populated as part of the initial superactive document 110 instance. The variables 404 represent specific changes that were made during the interactive edit process.

Edit resources 368 are functions used by all instances of the document through the interactive edit process. These edit resources 368 may include but are not limited to text styles, color family definitions, locales such as language definition and usage, and other elements that will affect the look and feel of the edit environment itself. Consequently these are elements of the design environment which do not differ by customer 364. As part of the definition of edit resources 368, the superactive document 110 may also allow or disallow certain usages of these edit resources 368. The resource restriction 384 component will dictate which of these edit resources 368 can be utilized and also which may be restricted.

Rules 370 are also defined at the top level of the document hierarchy. The rules 370 are identified and defined as part of the superactive document design phase. These rules 370 will be used to guide the user through the interactive edit experience. The rules will be architected once and at the top level of the superactive document design. As an example, rules 374 may include which paragraph of text corresponds to a zip code for insurance policy application. Another application of the rule 374 may be which type of currency is used in financial calculations determined from the locale in which the superactive document 110 is utilized.

Print resources 372 are also at the top level of the container file format hierarchy. Print resource 372 will typically not change across superactive document 110 instances. Resources for print may include items 386 that are generally specific to the print domain. These items 386 can include but are not limited to fonts 398, images 400, overlays 402 and other objects that are associated with the printing and output process.

User access rights 374 will not vary across superactive document 110 instances. These user access rights 374 may embody user access to read the document, user access to edit specific areas of the document, user access to approve the document and various other document rights that affect how an individual user can access and change the superactive document 110. The user access rights 374 are also stored at the top level of the superactive document 110 hierarchy since the user access rights are enforced across all users of the superactive document 110.

The instance data 376 contains variable values that were changed as part of the interactive edit experience. These changes will be based on specific customer representations of the superactive document 110 and multiple variables 404 may be changed for a specific customer 388. The instance data 376 is not part of the customers 364, because the instance data 376 may be used in other processes that the superactive document 110 influences. Having the instance data 376 at the top level of the hierarchy makes it is easier to access the data and provides better usability for users requiring this data as a part of another process.

Interaction history 378 contains the history 390 of how an individual user progressed through the interactive edit experience as well as a history 392 of the different workflow process steps that were engaged during the superactive document edit process. Having the interaction history component 378 at the top level in the hierarchy allows for better usability and access by additional processes within an enterprise workflow. The approvals, edit changes, and other historic information are stored separately so that other systems may easily identify approval chains and edit compliance.

The customers component 364 contains elements that are specific to an individual customer embodiment of the superactive document 110. Variable values 380 are pre-populated variables that are specifically tailored to the customer instance of the superactive document 110. Documents 382 contained in the embodiment for the specific customer of the document or sets of documents that accompanied the superactive document 110. Within these documents there are pages 394, interview forms 396, and other elements that compose the superactive document 110. Pages 394 contain objects that appear on the page such as text blocks, images, tables and other document content objects 406. The pages 394 may also contain guided fill 408 and edit selection controls 410 that dictates how an individual user navigates through the page as part of the interactive document edit experience. The content objects 406 may have different methods for editing the content and the area associated with the content 416. For example the user may have the ability to free-form edit within a text block an object or they may be required to select specific content from a drop-down menu type of system. Interview forms 396 are also part of the document and may be different for each individual customer. The interview form 396 may have a guided fill method 412 that will enable a user to quickly fill out the form in a controlled fashion. Edit selection and controls 414 may also be part of the interview forms 396 and will dictate which part of the form and individual user may be enabled to populate as well as how the interview form 396 will actually appear within the interactive edit experience.

Figure 9:
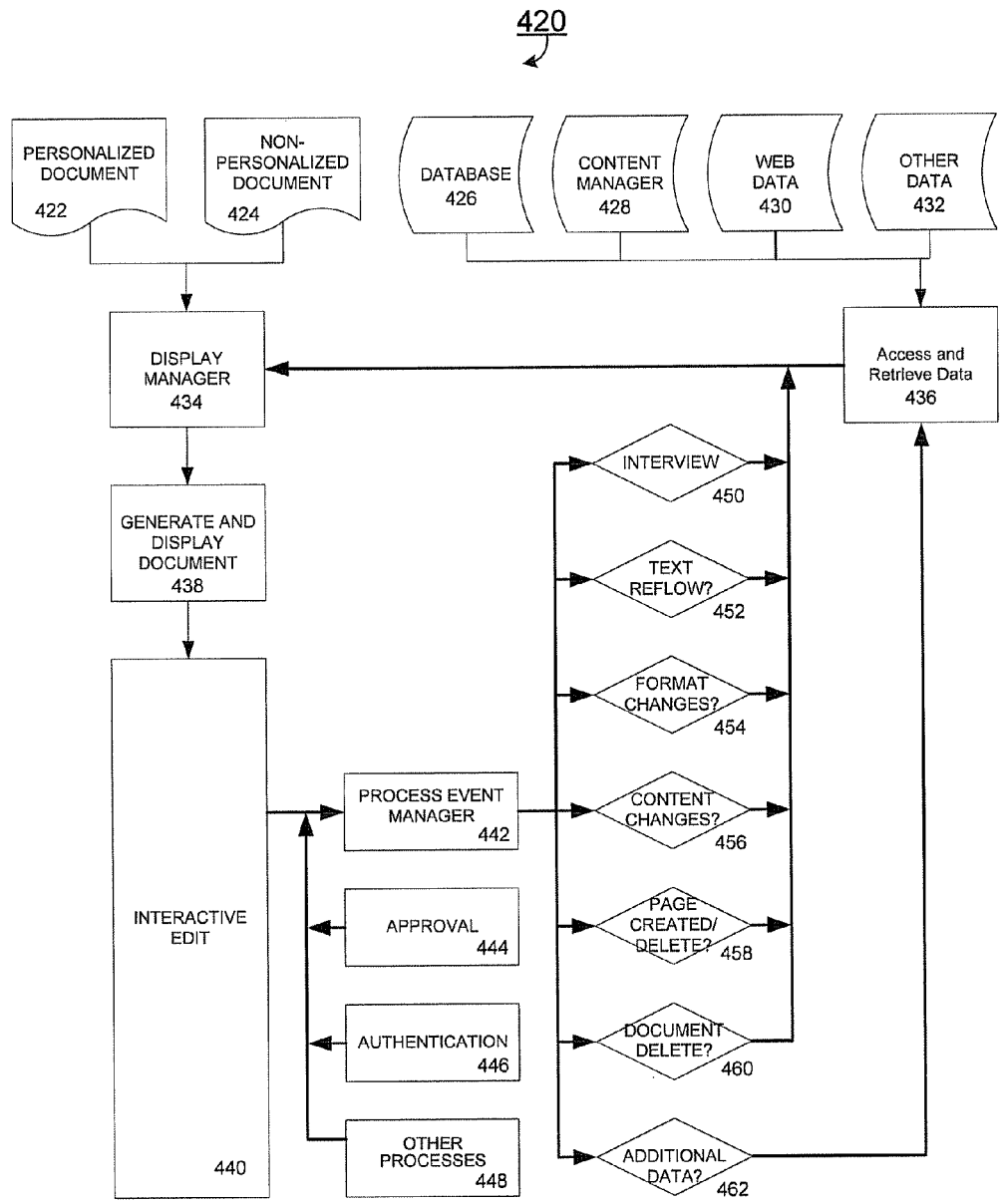
FIG. 9 is a flowchart illustrating the interactive edit process flow of a superactive document process of FIG. 1 according to aspects of the present invention.

FIG. 9 is a flowchart illustrating the interactive edit process flow 420 of a superactive document process of FIG. 1. The workflow illustrated in FIG. 9 is merely given as an example and an interactive edit process flow 420 may contain more extensive edit and orchestration function than is listed.

The initial document may be a personalized document 422 containing data and content that may have been embedded into the superactive document 110 as part of a design process or an initial data import process. The non-personalized document 424 contains the superactive document 110 template and may also contain data, content, and other information that has not yet been externalized to the viewable format of the document. As the superactive document 110 (422 or 424) enters the interactive edit experience, a display manager 434 will determine the objects of the document that may be displayed. The display characteristics dictating the portion of the superactive document 110 for display are governed by authentication rights or other superactive document orchestration methods as described above.

Once the display manager 434 determines the set or subset of objects to be included in the superactive document 110, the superactive document 110 is then generated and displayed 438. The current instance of the superactive document 110 will appear in an edit area which could be a thick client such as, for example, a Microsoft Windows application, or a thin client such as, for example, a Web browser. The edit experience may change its physical look and appearance through themes or skins which can be individualized on a user basis. At this point, the superactive document 110 is ready for editing by the user in the interactive edit environment 440.

Changes to the superactive document 110 can occur during the edit phase and may encompass edit functions which have been enabled during the superactive document design phase. Processes such as interview 450, text reflow 452, format changes 454, content changes 456, page delete/create 458, document delete 460, additional data 462 and virtually any other edit function, can be used within the interactive edit experience. The primary advantage of these superactive document 110 edit functions over those of a traditional word processing document is the ability to enable controlled edit of functions at a user, page, object, or document level.

Once an edit function has been utilized within the interactive edit experience, it must be determined whether additional data 436 is required as a result of the user interaction. Data may reside in external sources such as data bases 426, content management systems 428, other data 432, or as synchronous and asynchronous web data 430. Data might also exist within the superactive document 110 and may be added to the displayable format of the document. Once the data sources have been retrieved, if required, the display manager 434 will determine which objects may be displayed or added to the visual representation of the superactive document 110 and will generate and display the next instance of the document 438.

In addition to typical edit functions, the superactive document 110 interactive edit experience also allows integration into other processes and control methods. Process event manager 442 interfaces edit processes interview 450 et. al. with user interaction. Additional processes for approval 444 and authentication 446 (or other processes 448) can be controlled directly within the superactive document 110 and can present themselves in the interactive edit experience 440. For example, if a CSR in a retail and distribution process needs to fill out a form to enable a customer to order an item, the first instance of the superactive document 110 would be a form for the user to fill out. This form may have objects which only appear based on authentication (i.e. management might not want a CSR to see a social security number, thus it would be blanked out). After the CSR completes the order form, the form might have to be approved by management. This superactive document 110 would be sent to the manager. The manager would enter the edit experience and might only be presented with an approval interview overlay. The manager can review and approve the superactive document 110 which would represent the second instance of the document. The order fulfillment center would then receive the superactive document 110. At this point, the superactive document 110 might be interfaced to an inventory management system to determine whether the item being purchased exists in inventory. There might be an automated sign off process from the inventory system which adds data to the superactive document 110 indicating the item was in inventory. This would represent a third instance of the superactive document 110. The final step might be a manual confirmation that the item was actually shipped. The shipping agent would enter the edit experience and see the history of the order, see all of the approvals, check that the item was actually shipped, and then update the superactive document with a shipping status.

Figure 10:
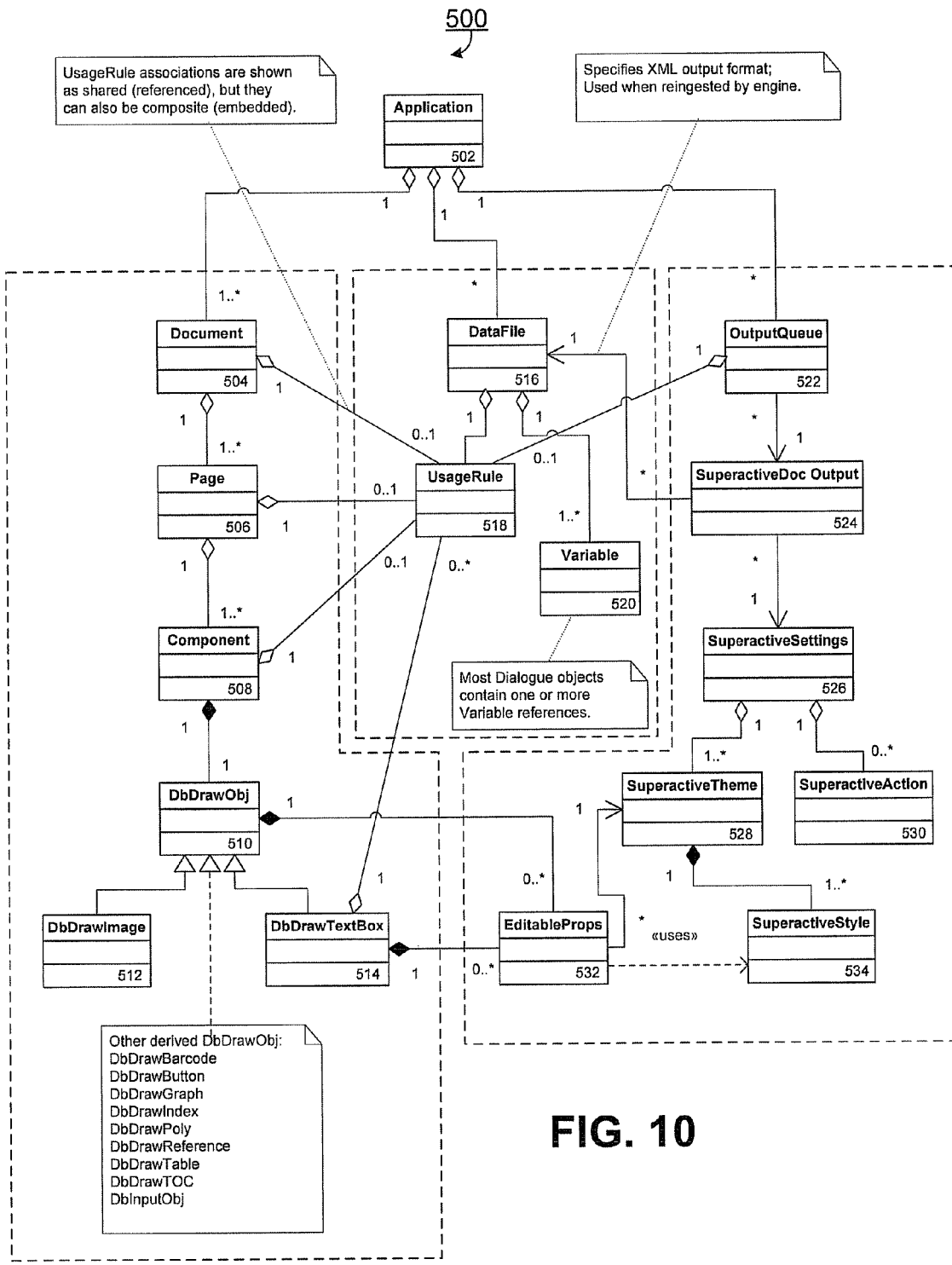
FIG. 10 is an object diagram representing the universal modeling language depiction of the superactive document application schema according to FIG. 1

FIG. 10 represents the Universal modeling language depiction of the superactive document application schema 500. The high-level extrapolation of the superactive document 110 is the application 502. An application 502 contains three primary elements: document 504, data file 516, and output queue 522. For each application 502 there will be one to many documents 504. For each application 502 there will be zero or more data files 516. For each application 502 there will be zero or more output queues 522. Therefore the minimal application 502 would contain one superactive document 110.

Within the document 504, there can be one to many pages 506. The document 504 itself will have a usage rule 518 applied to it which will dictate whether the document 504 should be included within the application 502 or not. Each page 506, likewise, will have a usage rule 518 associated with it indicating whether the page 506 should appear within the document 504. The usage rules 518 can be defined in many ways. For example a page 506 may not appear in the document 504 if a specific jurisdiction does not require the page 504 to be represented. This may occur in an insurance policy application where a certain page 504 is only needed in certain cities or counties. Within the page 506 there can be one to many components 508. These components 508 are also governed by usage rules 518 indicating whether or not they will appear on the page 506. Associated with each component 508 is one specific draw object 510. The draw object 510 will contain specific objects which may be represented as images 512, text boxes 514, barcodes, tables, indices, graphs, or a variety at the other objects that may appear on a page 506. Each of these draw objects 510 can be governed by a usage rule 518 dictating whether or not it will appear on the page 506.

The data file 516 element of the application 502 contains variables 520 and the mapping of variables 520 to discrete data. There can be many variable instances within a data file 516. Usage rules 518 will dictate whether the data file 516 will be used or not within the application 502. Most data file 516 objects contain one or more variable 520 references.

The output queue 522 is the third component of the application 502. Each application 502 can have zero to many output queues 522. The output queue 522 and its use within the superactive document 110 can be controlled by a usage rule 518. This will allow a user to have access to output or a different user to not have access to output. The superactive document 110 output, as depicted as SuperactiveDocOutput 524 in FIG. 10, can be driven from many different output queues 522. The SuperactiveSettings 526 component is the basis by which the superactive document 110 manifests itself in the interactive user experience. The SuperactiveSettings 526 is the master control component for the superactive document 110. SuperactiveSettings 526 can have many SuperactiveThemes 528 and many SuperactiveActions 530. A SuperactiveTheme 528 dictates the look and feel of the superactive document 110 edit experience. This may contain many SuperactiveStyles 534 which can enable a personalized edit experience for each individual user. As part of the SuperactiveTheme 528, EditableProps 532 can be utilized to dictate how an object and edit area or a content section may appear within the SuperactiveTheme 528. SuperactiveActions 530 are components that enable function associated with the superactive document 110. These functions may include submit, get paid, store data, and other control functions that are required as part of the superactive document 110 edit experience.

Figure 11:
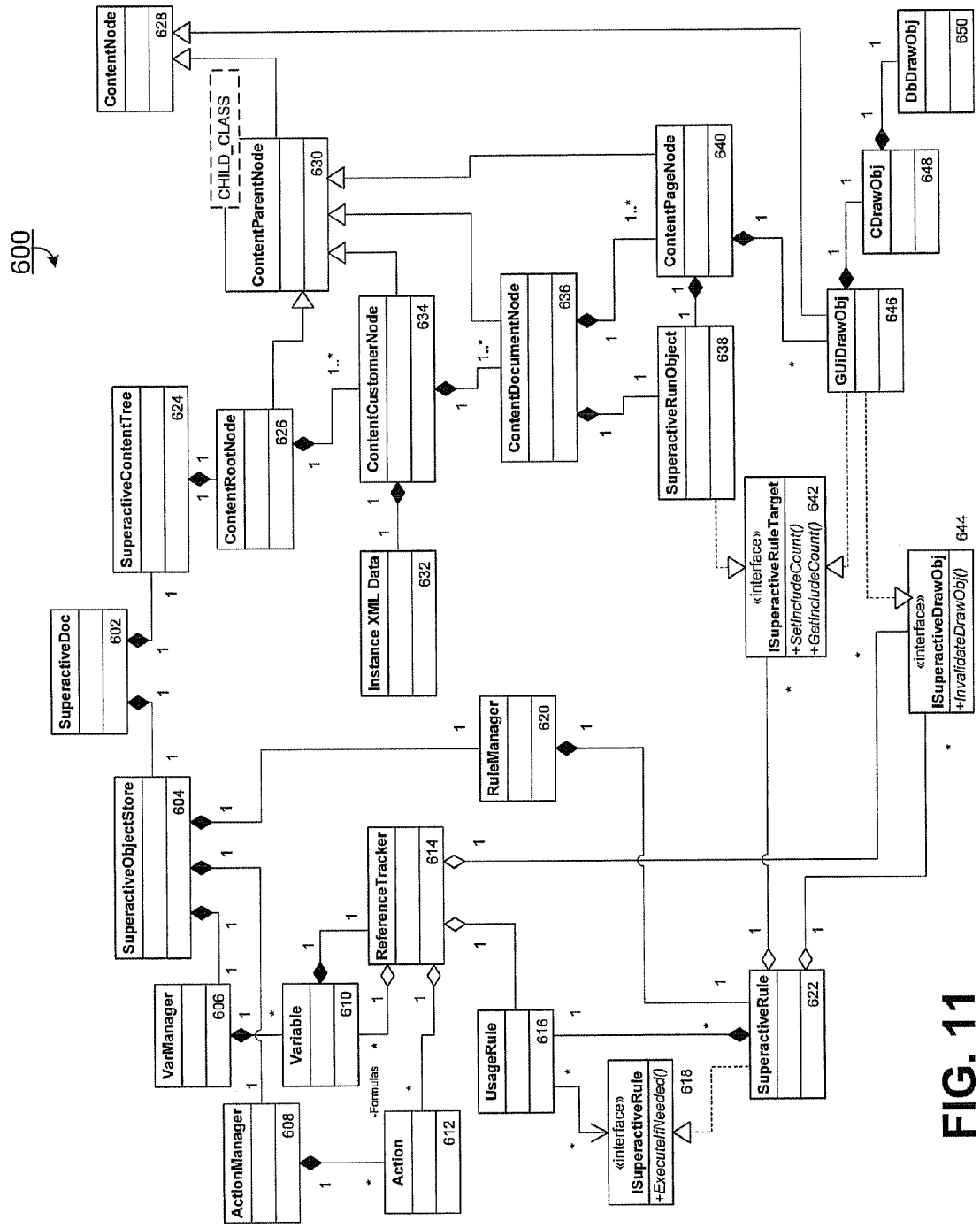
FIG. 11 is an object diagram depicting the top level class of a superactive document according to FIG. 10.

FIG. 11 is a universal modeling language description 600 of a superactive document 110 and how live interactions occur. The superactive document 110 top level class is depicted as SuperactiveDoc 602 contains two structures; the SuperactiveObjectStore 604 and the SuperactiveContentTree 624. This universal modeling language description 600 shows the hierarchy for objects and the tree structure for content. FIG. 11 represents the interaction that occurs within a superactive document 110.

It will be appreciated by those of skill in the art that the object names utilized in the discussion regarding FIG. 11 are chosen to match with the general functionality of each object. This choice is made for ease in understanding the functionality so indicated, but need not necessarily be chosen in this fashion.

The SuperactiveObjectStore 604 hierarchy contains three primary elements an ActionManager 608, a VarManager 606 and a RuleManager 620. The ActionManager 608 coordinates various actions 612 that can be utilized as part of the superactive document 110 process. The VarManager 606 manages all of the variables 610 and how the variables 610 are updated and referenced as part of the superactive document 110 process. The RuleManager 620 owns and tracks the rules that are utilized as part of the superactive document 110 process. The ActionManager 608 will manage zero to many different actions 612. The VarManager 606 will manage zero to many variables 610. The RuleManager 620 will manage zero to many SuperactiveRules 622.

Variables 610, actions 612, usage rules 616, and draw objects are updated by the ReferenceTracker 614. Each variable 610 has a unique ReferenceTracker 614 associated with the variable 610. As a variable 610 changes, the ReferenceTracker 614 is responsible for controlling the updating of all actions 612, variables 610, usage rules 616 and draw rules that are associated with that variable 610. For example, a variable 610 named A may be used in a formula named X. This formula may be used by a rule on a page or a rule within a text box. When the variable A changes, the ReferenceTracker 614 will update the occurrences which reference variable A throughout the formulas, actions, rules and objects. The ReferenceTracker 614 will interrogate the action 612 and if a variable 610 has changed the action 612 will be updated. Likewise if a variable 610 is used within a text object the ReferenceTracker 614 will initiate an update process for the text object. This may result in the reformatting of a text block within the superactive document 110. If the variable 610 is used within a formula the ReferenceTracker 614 will update the formula and its calculated value based on the new variable 610 information. In this fashion all variable 610 changes will be reflected throughout the actions 612, rules, or draw objects as managed and controlled by the ReferenceTracker 614. The ReferenceTrackers 614 associated with each variable 610 allow for automated updating and policing of variable 610 changes. As part of the compilation process for a superactive document 110, circular references for variables 610 will be identified as errors to eliminate looping.

The RuleManager 620 controls the SuperactiveRules 622 in a manner similar to the ReferenceTracker 614. The RuleManager 620 will propagate changes associated with a SuperactiveRule 622 to the entire object and content class structure. The SuperactiveRule 622 is also controlled by a usage rule 616 (via interface 618) indicating whether the SuperactiveRule 622 should be executed or not.

The SuperactiveRule 622 influences the operations of three different types of objects—SuperactiveRunObjects 638, DrawObjs, and components within DrawObjs. A SuperactiveRunObject 638 is a document or page object. A DrawObj may be any type of entity which appears within a page. For example, the DrawObj may be a text block, an image, a bar code or another page object. Each draw object has three levels of hierarchy associated the object. The GUI DrawObj 646 contains the display and interactive constructs. The CDrawObj 648 contains the working description of the object and its packaging information. The DBDrawObj 650 is the stored representation of the object.

The SuperactiveRule 622 will determine how all of these objects appear in their various manifestations. For example, a SuperactiveRule 622 can be used to determine whether a DrawObj appears or disappears from a page. The SuperactiveRule 622 will also determine which text inside at a DrawObj may be changed. The ISuperactiveRuleTarget 642 represents an interface component that allows the SuperactiveRule 622 to influence RunObjects and DrawObjs. The SuperactiveDrawObj 644 interface allows a SuperactiveRule 622 to influence content which is contained within the DrawObj itself.

The superactive content tree 624 structure is comprised of a hierarchy of nodes. The ContentRootNode 626 is the main starting point for the content structure. The ContentRootNode 626 may have one to many ContentCustomerNodes 634 linked to it. The ContentParentNode 630 is a templated class that defines the behavior for all parent objects which are associated with the content tree. The four instantiations of the ContentParentNode 630 are the ContentRootNode 626, the ContentDocumentNode 636, the ContentPageNode 640 and the ContentCustomerNode 634. The ContentNode 628, in the upper right-hand corner of FIG. 11, is a base class for both the ContentParentNode 630 and its children as well as the DrawObjs. In this fashion the hierarchy has delineated the ContentParentNode 630 and its possible children from the leaves in the tree which are depicted by the DrawObjs both of which can be accessed from the ContentNode 628 structure. Connected to the ContentCustomerNode 634 is the XML Instance Data 632. This is data which has been modified based on a specific customer during the pre-population or interactive edit experience. Underneath the ContentCustomerNode 634 there can be one to many ContentDocumentNodes 636. The ContentDocumentNode 636 represents an occurrence of a document that is associated with a specific customer. Under each ContentDocumentNode 636 there can be one to many ContentPageNodes 640. This allows for documents to be composed of many different pages. ContentDocumentNodes 636 and Content PageNodes 640 both contain a SuperactiveRunObject 638. The SuperactiveRunObject 638 dictates which pages and which documents will be presented and utilized as part of the superactive document 110 process. The ContentPageNode 640 contains zero to many DrawObjs which may be utilized within the page. This allows a page to have images, text boxes, tables, barcodes, or other objects contained within its definition. The ISuperactiveRuleTarget 642 interface will determine which of the DrawObjs are included on the specific page. The ISuperactiveDrawObj 644 interface will dictate which elements within an object will change or appear on the page.

Additional Embodiments

Additional embodiments of a superactive document 110 are set forth hereafter.

One embodiment of a superactive document 110 allows for a superactive document 110 wherein predetermined information in the superactive document 110 is obtained from another instance of a superactive document 110.

Additionally, a superactive document 110 allows for morphing as a function of user interaction and a superactive document 110 has the capability to change format based on user interaction. Such an embodiment would provide a method for processing a document such that the document is changed from a first type of document to a second type of document as a function of user interaction, comprising the steps of: providing a superactive document 110 of a first type (via a document creation process), the first type of document including at least one component of user-perceptible information corresponding to the first type; providing an interaction component ("interview") in the document file that provides for user interaction with the document; as a function of information in the interaction component, receiving user input as a function of user interaction; modifying content elements or data in the first type of document in response to the user input; and determining when enough components of the first type of document have changed sufficiently so that the document is now properly categorized as a second type of document.

Further, a superactive document 110 allows for automation of document processes through collaboration interaction, where the superactive document 110 builds a process around the document such that the document becomes the process. Such an embodiment would provide a method for generating a superactive document 110 that conveys user-perceptible information and is utilized in a computer-implemented business process, comprising the steps of: providing a superactive document 110, via a document creation process, including at least one component for providing user-perceptible information and at least one computer-readable component, and at least one interactive component ("interview"); as a function of information in the interactive component, receiving user input as a function of user interaction; storing information received during the user interaction in the document in a predetermined document file format, at least some of the interactive information corresponding to process-specific information required by a computer-implemented process; and providing the document with the process-specific information to the computer implemented process for use in effecting the computer-implemented process.

Also, a superactive document 110 allows for polymorphic mapping of data elements though interactive document manipulation such that data can be taken from sources, modified through user interaction, and placed back into data sources or add additional sources. Such an embodiment would provide a method for generating a superactive document 110 that conveys user-perceptible information, comprising the steps of: providing a superactive document 110 (via a document creation process) including at least one component for providing user-perceptible information and at least one computer-readable component, and at least one interaction component ("interview"); as a function of information in the interaction component, receiving user input as a function of user interaction with the superactive document 110; in response to receipt of user input corresponding to information stored in an external source, retrieving predetermined external data from the external data source; modifying the superactive document 110 utilizing the received user input and the external data; and storing updated information from the superactive document 110 in the external data source, so as to update the predetermined external data in the external data source. Such a superactive document 110 could further comprise an electronic document represented by a predetermined electronic document file format.

Further, a superactive document 110 allows for multi-sourced data element utilization in a superactive document 110 environment such that the ability to blend data from database, interactive data, and asynchronous data (web) into an interactive document process. Such an embodiment would provide a method for generating a superactive document 110 that conveys user-perceptible information and includes information from a database, user-input information, and asynchronous information, comprising the steps of: providing a superactive document 110 (via a document creation process) including at least one component for providing user-perceptible information and at least one computer-readable component, and at least one interaction component ("interview"); as a function of information in the interaction component, receiving user input as a function of user interaction with the superactive document 110; retrieving information from the database and including the information in the superactive document 110; in response to predetermined condition, receiving information from an asynchronous data source (web/Internet); in response to receipt of user input corresponding to information stored in an (external) source, retrieving predetermined external data; modifying the superactive document 110 utilizing the user-input information, the external data, and the asynchronous information; and storing updated superactive document 110 in a document repository.

Still further, a superactive document 110 allows for generalized application infrastructure for the conveyance of varied data sources in an superactive document 110 process, having the capability to allow multiple types of documents to be created and propagated through its infrastructure. Such an embodiment would provide a method for generating a plurality of different types of superactive documents 110 each of which conveys user-perceptible information and includes information from a plurality of different data sources (including external database, user interaction, and asynchronous data sources), comprising the steps of: providing a superactive document 110 (via a document creation process) including at least one component for providing user-perceptible information and at least one interaction component ("interview"); as a function of information in the interaction component, receiving user input as a function of user interaction with the superactive document 110; retrieving information from plurality of different data sources and including the information in the superactive document 110; modifying the superactive document 110 utilizing the user-input information and information from the plurality of different data sources; and storing the updated superactive document 110 in a document repository.

Finally, a superactive document 110 embodiment allows for a system for generating a customized superactive document 110, comprising: a design interface for receiving operator commands and selection of content for creating a superactive document 110; a design database for storing predetermined content, interaction orchestration components, and predetermined control components, for selection and utilization by a designer/user in creating a base superactive document 110; an application package component for storing interactive data, among others; an assembly engine coupled to the application package for combining data received from external data sources (data input) with the base superactive document 110 to provide an output superactive document 110 (personalized output); and an output interface for providing the output superactive document 110 to a utilization process for utilization (display, interaction, print, submit to other processes, etc.). Such a system could further comprise the design interface coupled to enterprise data resources comprising preexisting enterprise data (preexisting enterprise documents) for incorporation into the base superactive document 110. Further, such a system could allow the data from external data sources comprises information selected from databases, corporate contents, XML files, legacy print files, Websphere MQ, JMS, SOAP, and other data. Still further, such a system could further comprise that the output interface provides personalized print output/personalized electronic output. Finally, such a system could further comprise a tracking knowledgebase coupled to receive and store information generated by user interaction with the superactive document 110.

Accordingly, it will be understood that various embodiments of the present invention described herein are preferably implemented as a special purpose or general-purpose computer including various computer hardware as discussed in greater detail below. Embodiments within the scope of the present invention also include computer-readable media for carrying or having computer-executable instructions or data structures stored thereon. Such computer-readable media can be any available media which can be accessed by a general purpose or special purpose computer, or downloadable to through wireless communication networks. By way of example, and not limitation, such computer-readable media can comprise physical storage media such as RAM, ROM, flash memory, EEPROM, CD-ROM, DVD, or other optical disk storage, magnetic disk storage or other magnetic storage devices, any type of removable non-volatile memories such as secure digital (SD), flash memory, memory stick etc., or any other medium which can be used to carry or store computer program code in the form of computer-executable instructions or data structures and which can be accessed by a general purpose or special purpose computer, or a mobile device.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the invention may be implemented. Although not required, the inventions will be described in the general context of computer-executable instructions, such as program modules, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Those skilled in the art will also appreciate that the invention may be practiced in network computing environments with many types of computer system configurations, including personal computers, hand-held devices, multiprocessor systems, microprocessor-based or programmable consumer electronics, networked PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the inventions, which is not illustrated, includes a general purpose computing device in the form of a conventional computer, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, other types of computer readable media for storing data can be used, including magnetic cassettes, flash memory cards, digital video disks (DVDs), Bernoulli cartridges, RAMs, ROMs, and the like.

Computer program code that implements most of the functionality described herein typically comprises one or more program modules may be stored on the hard disk or other storage medium. This program code, as is known to those skilled in the art, usually includes an operating system, one or more application programs, other program modules, and program data. A user may enter commands and information into the computer through keyboard, pointing device, or other input devices (not shown), such as a microphone, game pad, satellite dish, scanner, or the like. These and other input devices are often connected to the processing unit through known electrical, optical, or wireless connections.

The main computer that effects many aspects of the inventions will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), and wireless LANs (WLAN) that are presented here by way of example and not limitation. Such networking environments are commonplace in office-wide or enterprise-wide computer networks, intranets and the Internet.

When used in a LAN or WLAN networking environment, the main computer system implementing aspects of the invention is connected to the local network through a network interface or adapter. When used in a WAN or WLAN networking environment, the computer may include a modem, a wireless link, or other means for establishing communications over the wide area network, such as the Internet. In a networked environment, program modules depicted relative to the computer, or portions thereof, may be stored in a remote memory storage device. It will be appreciated that the network connections described or shown are exemplary and other means of establishing communications over wide area networks or the Internet may be used.

In view of the foregoing detailed description of preferred embodiments of the present invention, it readily will be understood by those persons skilled in the art that the present invention is susceptible to broad utility and application. While various aspects have been described in the context of a preferred embodiment, additional aspects, features, and methodologies of the present invention will be readily discernable therefrom. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present inventions. In addition, some steps may be carried out simultaneously. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A document-centric information system comprising:
an information database;
an interactive document usable at a user station, the interactive document including:
a graphical user interface including an interview pane providing user selectable content choices and user selectable format choices, wherein the graphical user interface operates independent of the information database during a user selection and wherein the graphical user interface captures live data comprising live input of a live user interaction with the graphical user interface, wherein the live user interaction with the graphical user interface includes a live person-to-person interaction; and
a communication module to directly supply updated information to the information database based upon a user modification to the interactive document, the user modification based on the captured live data; and
an utilization mechanism linked to the information database to directly and automatically initiate at least one of a plurality of utilization processes upon supplying the updated information to the information database, wherein at least one of the plurality of utilization processes includes use of at least some of the captured live data from the interactive document and at least some of the utilization processes include causing an action external to the interactive document based on the information in the interactive document.

2. The document-centric information system of claim 1, wherein at least some of the utilization processes of the utilization mechanism comprise at least one of:
creating, printing, or mailing a document;
causing manufacture of a product related to the information in the interactive document;
fulfilling an order for goods or services related to the information in the interactive document; or
delivering a product related to the information in the interactive document.

3. The document-centric information system of claim 1, comprising:
a feedback module to update the modified interactive document, based on a result of one of the utilization processes, with at least one of content and format.

4. The document-centric information system of claim 3, wherein the updated content of the interactive document includes a tracking component that tracks at least one of:
the information supplied to the information database that prompted the modification of the interactive document that led to the respective utilization processes; and
a report of utilization processes initiated upon updating the information database with information from the modified interactive document.

5. The document-centric information system of claim 3, wherein the feedback module is to update the utilization mechanism to provide second utilization processes based upon the results of one or more the respective first utilization processes.

6. The document-centric information system of claim 1, wherein a first instance of the interactive document includes an implemented design that establishes a scope of the interactive document that is not changeable by the user during modification of the interactive document, the scope including at least one of:
a type of content;
which non-asynchronous external data sources are accessible during the document manipulation process;
when the non-asynchronous external data sources are accessible relative to selecting the content of the interactive document;
authentication rules regarding an ability, based on an identity of a user type, to change content elements or format elements of the interactive document; and
format of components forming graphical user interface.

7. The document-centric information system of claim 6, wherein the implemented design of the interactive document is expressed in an electronic file format structure as a container storable in a non-transitory computer readable medium.

8. The document-centric information system of claim 1, wherein the system is operated as an application service provider accessible via a network communication.

9. A method, comprising:
providing an interactive document usable at a user station, the interactive document including:
a graphical user interface including an interview pane providing user selectable content choices and user selectable format choices, wherein the graphical user interface operates independent of an information database during a user selection and wherein the graphical user interface captures live data comprising live input of a live user interaction with the graphical user interface, wherein the live user interaction with the graphical user interface includes a live person-to-person interaction; and a communication module to directly supply updated information to the information database based upon a user modification to the interactive document, the user modification based on the captured live data; and providing an utilization mechanism linked to the information database to directly and automatically initiate at least one of a plurality of utilization processes upon supplying the updated information to the information database, wherein at least one of the plurality of utilization processes includes use of at least some of the captured live data from the interactive document and at least some of the utilization processes include causing an action external to the interactive document based on the information in the interactive document.

10. The method of claim 9, wherein at least some of the utilization processes of the utilization mechanism comprise at least one of:

creating, printing, or mailing a document;
causing manufacture of a product related to the information in the interactive document;
fulfilling an order for goods or services related to the information in the interactive document; or
delivering a product related to the information in the interactive document.

11. The method of claim 9, comprising:
a feedback module to update the modified interactive document, based on a result of one of the utilization processes, with at least one of content and format.

12. The method of claim 11, wherein the updated content of the interactive document includes a tracking component that tracks at least one of:
the information supplied to the information database that prompted the modification of the interactive document that led to the respective utilization processes; and
a report of utilization processes initiated upon updating the information database with information from the modified interactive document.

13. The method of claim 11, wherein the feedback module is to update the utilization mechanism to provide second utilization processes based upon the results of one or more the respective first utilization processes.

14. The method of claim 9, wherein a first instance of the interactive document includes an implemented design that establishes a scope of the interactive document that is not changeable by the user during modification of the interactive document, the scope including at least one of:
a type of content;
which non-asynchronous external data sources are accessible during the document manipulation process;
when the non-asynchronous external data sources are accessible relative to selecting the content of the interactive document;
authentication rules regarding an ability, based on an identity of a user type, to change content elements or format elements of the interactive document; and
format of components forming graphical user interface.

15. The method of claim 14, wherein the implemented design of the interactive document is expressed in an electronic file format structure as a container storable in a non-transitory computer readable medium.

16. The method of claim 9, wherein the utilization mechanism is operated at an application service provider accessible via a network communication.

17. A non-transitory computer readable medium, comprising instructions for:
providing an interactive document usable at a user station, the interactive document including:
a graphical user interface including an interview pane providing user selectable content choices and user selectable format choices, wherein the graphical user interface operates independent of an information database during a user selection and wherein the graphical user interface captures live data comprising live input of a live user interaction with the graphical user interface, wherein the live user interaction with the graphical user interface includes a live person-to-person interaction; and
a communication module to directly supply updated information to the information database based upon a user modification to the interactive document, the user modification based on the captured live data; and
providing an utilization mechanism linked to the information database to directly and automatically initiate at least one of a plurality of utilization processes upon supplying the updated information to the information database, wherein at least one of the plurality of utilization processes includes use of at least some of the captured live data from the interactive document and at least some of the utilization processes include causing an action external to the interactive document based on the information in the interactive document.

18. The non-transitory computer readable medium of claim 17, wherein at least some of the utilization processes of the utilization mechanism comprise at least one of:
creating, printing, or mailing a document;
causing manufacture of a product related to the information in the interactive document;
fulfilling an order for goods or services related to the information in the interactive document; or
delivering a product related to the information in the interactive document.

19. The non-transitory computer readable medium of claim 17, comprising instructions for:
a feedback module to update the modified interactive document, based on a result of one of the utilization processes, with at least one of content and format.

20. The non-transitory computer readable medium of claim 19, wherein the updated content of the interactive document includes a tracking component that tracks at least one of:
the information supplied to the information database that prompted the modification of the interactive document that led to the respective utilization processes; and
a report of utilization processes initiated upon updating the information database with information from the modified interactive document.

21. The non-transitory computer readable medium of claim 19, wherein the feedback module is to update the utilization mechanism to provide second utilization processes based upon the results of one or more the respective first utilization processes.

22. The non-transitory computer readable medium of claim 17, wherein a first instance of the interactive document includes an implemented design that establishes a scope of the interactive document that is not changeable by the user during modification of the interactive document, the scope including at least one of:
- a type of content;
- which non-asynchronous external data sources are accessible during the document manipulation process;
- when the non-asynchronous external data sources are accessible relative to selecting the content of the interactive document;
- authentication rules regarding an ability, based on an identity of a user type, to change content elements or format elements of the interactive document; and
- format of components forming graphical user interface.

23. The non-transitory computer readable medium of claim 22, wherein the implemented design of the interactive document is expressed in an electronic file format structure as a container storable in a non-transitory computer readable medium.

24. The non-transitory computer readable medium of claim 17, wherein utilization mechanism is operated at an application service provider accessible via a network communication.

* * * * *